US010383287B2

(12) United States Patent
Kingelin et al.

(10) Patent No.: US 10,383,287 B2
(45) Date of Patent: Aug. 20, 2019

(54) VERTICAL PLANTER FOR GROWING PLANTS

(71) Applicant: 3GREN OY, Espoo (FI)

(72) Inventors: Tuukka Kingelin, Helsinki (FI); Markus Nilsson, Espoo (FI)

(73) Assignee: 3GREN OY, Espoo (FI)

( * ) Notice: Subject to any disclaimer, the term of this patent is extended or adjusted under 35 U.S.C. 154(b) by 85 days.

(21) Appl. No.: 15/316,089

(22) PCT Filed: Jun. 2, 2015

(86) PCT No.: PCT/FI2015/050380
§ 371 (c)(1),
(2) Date: Dec. 2, 2016

(87) PCT Pub. No.: WO2015/185801
PCT Pub. Date: Dec. 10, 2015

(65) Prior Publication Data
US 2017/0105360 A1    Apr. 20, 2017

(30) Foreign Application Priority Data
Jun. 2, 2014   (FI) ..................................... 20145501

(51) Int. Cl.
*A01G 9/02*   (2018.01)
*A01G 7/04*   (2006.01)
(Continued)

(52) U.S. Cl.
CPC ............... *A01G 9/022* (2013.01); *A01G 7/04* (2013.01); *A01G 24/00* (2018.02); *A01G 31/06* (2013.01); *Y02P 60/216* (2015.11)

(58) Field of Classification Search
CPC ........ A01G 9/022; A01G 9/023; A01G 9/027; A01G 9/0297; A01G 31/06
(Continued)

(56) References Cited

U.S. PATENT DOCUMENTS 4,662,106 A * 5/1987 Mori .................... A01G 7/045
                                                    47/17
5,454,187 A * 10/1995 Wasserman ............ A01G 7/045
                                                    47/39
(Continued)

FOREIGN PATENT DOCUMENTS

CN    102640674 A     8/2012
DE       3839461 A1 *  4/1989  ............. A01G 9/022
(Continued)

OTHER PUBLICATIONS

English-language translation of DE 3839461 (Year: 1989).*
(Continued)

*Primary Examiner* — Lisa L Tsang
(74) *Attorney, Agent, or Firm* — Buchanan Ingersoll & Rooney PC

(57) ABSTRACT

A vertical planter for growing plants includes a frame, a plurality of support planes each having a support surface for supporting at least one plant, wherein the plurality support planes are supported by the frame and a nutrient supply system including a nutrient distribution feature for delivering liquid nutrient to the support surface of a uppermost support plane, a nutrient conducting arrangement for conducting liquid nutrient from the uppermost support plane to a lowermost support plane via the support surface of intermediate support planes, and nutrient receiving feature for receiving liquid nutrient from the support surface of the lowermost support plane.

38 Claims, 24 Drawing Sheets

Figure 1:
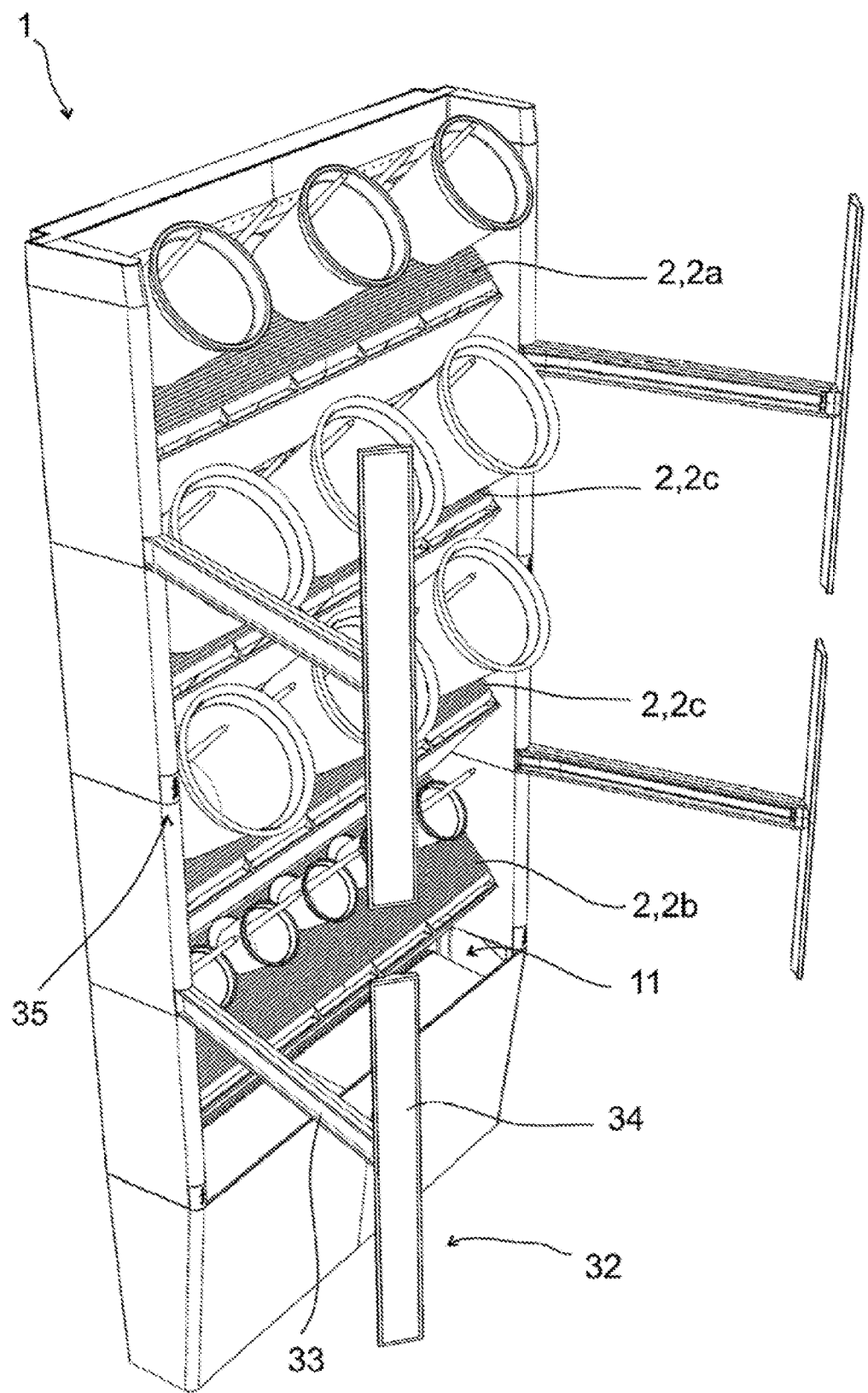

(51) Int. Cl.
*A01G 31/06* (2006.01)
*A01G 24/00* (2018.01)

(58) Field of Classification Search
USPC .......... 47/66.5, 79, 82, 83, 48.5, 62 C, 62 N
See application file for complete search history.

(56) References Cited

U.S. PATENT DOCUMENTS

| | | | | |
|---|---|---|---|---|
| 6,499,249 | B1* | 12/2002 | Luijkx | A47F 7/0078 |
| | | | | 206/423 |
| 7,080,482 | B1* | 7/2006 | Bradley | A01G 31/02 |
| | | | | 47/60 |
| 7,243,460 | B2* | 7/2007 | Darlington | A01G 31/02 |
| | | | | 47/59 S |
| 7,788,848 | B1 | 9/2010 | Koumoudis | |
| 8,966,819 | B1* | 3/2015 | Cosmann | A01G 9/023 |
| | | | | 47/83 |
| 9,844,188 | B2* | 12/2017 | Legerton | A01G 9/033 |
| 2002/0084346 | A1* | 7/2002 | Katzman | A01G 9/022 |
| | | | | 239/17 |
| 2009/0031629 | A1* | 2/2009 | Riesterer | A01G 9/02 |
| | | | | 47/66.7 |
| 2009/0223126 | A1 | 9/2009 | Garner et al. | |
| 2010/0146855 | A1* | 6/2010 | Ma | A01G 9/025 |
| | | | | 47/82 |
| 2012/0210637 | A1* | 8/2012 | Kamahara | A01G 7/045 |
| | | | | 47/17 |
| 2013/0152467 | A1* | 6/2013 | Chang | A01G 9/025 |
| | | | | 47/82 |
| 2013/0180172 | A1* | 7/2013 | Silverberg | A01G 9/022 |
| | | | | 47/65 |
| 2013/0291435 | A1* | 11/2013 | Gettig | A01G 27/02 |
| | | | | 47/79 |
| 2018/0092314 | A1* | 4/2018 | McGuinness | A01G 9/023 |

FOREIGN PATENT DOCUMENTS

| | | | |
|---|---|---|---|
| EP | 0623276 A2 * | 11/1994 | ............ A01G 9/023 |
| GB | 2481823 A | 1/2012 | |
| KR | 10-2003-0086903 A | 8/2013 | |
| WO | WO 2007/101339 A1 | 9/2007 | |
| WO | WO 2011/136842 A1 | 11/2011 | |
| WO | WO 2012/066212 A1 | 5/2012 | |

OTHER PUBLICATIONS

International Search Report (PCT/ISA/210) dated Oct. 7, 2015, by the European Patent Office as the International Searching Authority for International Application No. PCT/FI2015/050380.

Written Opinion (PCT/ISA/237) dated Oct. 7, 2015, by the European Patent Office as the International Searching Authority for International Application No. PCT/FI2015/050380.

Notification of Transmittal of the International Preliminary Report on Patentability (Form PCT/IPEA/416) and International Preliminary Report on Patentability (Form PCT/IPEA/409) dated May 30, 2016, in the corresponding International Application No. PCT/FI2015/050380.

Search Report dated Dec. 9, 2014, by the Finnish Patent Office in corresponding Finnish Patent Application No. 20145501.

* cited by examiner

VERTICAL PLANTER FOR GROWING PLANTS

FIELD OF THE INVENTION

The invention relates to a vertical planter for growing plants as defined in the preamble of independent claim 1.

Various vertical planters are known in the art.

Publication GB 2481823 presents a plant container comprises a back panel, two side panels and a plurality of removable/interchangeable shelves/soil retainers. When assembled a multi-tiered planter is formed. The soil retainers have a slot which fits over an edge of the side panels. The retainers may be secured by pegs inserted through holes. Soil retainers may be used to create a horizontal shelf or an inclined surface. By altering the positioning of the retainers, it is possible to grow plants (when the container is filled with soil or earth), with differing soil depth needs such as salads or potatoes. Some of the retainers may have at least one longitudinal slot to allow rows of plants to grow through, thereby minimizing weed growth. A compost bin may be formed when all the side edges of the panels are covered by retainers.

Publication WO 2011/136842 presents a vertical planter includes stackable planter units each with plural sections in which plural plants can be planted. Each section of a planter unit can have a removable faceplate for placing soil in the planter section and planting plants in the soil, or potted plants can be placed in the faceplate openings. Water is provided to each planter section via a drip irrigation tube fed from a main water supply tube that extends to each planter unit. The drain water from each planter unit drains down through an underlying planter unit and into an underlying water reservoir.

Publication WO 2012/066212 presents a device for creating a wall intended to be planted, comprising a reservoir for storing liquid, particularly rainwater, a cage extending vertically and intended to contain a substrate for supplying liquid to the plants, means of attaching the cage to a vertical wall of the reservoir, and means of watering the plants supplied with water by the substrate, the watering means being supplied with water from the water reservoir.

Publication KR 20130086903 presents a multilayer flowerpot is provided to facilitate maintenance, and to plant many plants. The multilayer flowerpot comprises a body supporting the whole multilayer flowerpot. An inclined plate accommodates plants for hydroponics, and installed separately from the rear side of the body. A rear plate is fixed on the rear side of the body, and induces the water flowing out of the inclined plate to the front side of the inclined plate at the bottom. A water storage part stores the water flowing through the plants. A water supply part flows some water to the lower part. A pump device 55 transfers the water of the water storage part to the water supply part. The length of the rear plate is longer than the gap. The inclined plate is installed at an angle of 30-60 degree to the horizon.

Publication U.S. Pat. No. 7,788,848 presents a green wall planting module has a rear wall, two side walls and a top and bottom wall, the top wall having a concave shape for receiving within its cross section a bottom wall of a green wall planting module mounted approximately one to four millimeters above it on a grid wall structure to suppress splashing and retain rain water. The grid wall structure comprises horizontal rods associated with a vertical wall structure of, for example, a building. The top wall of a lower mounted green wall module comprises an integral slot adapted to receive a horizontal irrigation pipe or hose which may lie horizontally in and longitudinally along the slot when the green wall modular apparatus is mounted to the grid wall. Tapered louvers are provided within the green wall planting module slanting upward from the rear wall at a predetermined angle within the module so as to collect and retain water as does the bottom concave wall of the apparatus. A controlled irrigation system including a cistern and rain barrel is provided to re-circulate collected rain water to plantings horizontally displayed by the green wall planting module.

OBJECTIVE OF THE INVENTION

The object of the invention is to provide a vertical planter for growing plants, which vertical planter has an effective and at the same aesthetic watering system.

SHORT DESCRIPTION OF THE INVENTION

The invention relates also to the use of the vertical planter in a hotel, a flower shop, in a mall, in a shopping center, or in an office building.

LIST OF FIGURES

Figure 2:
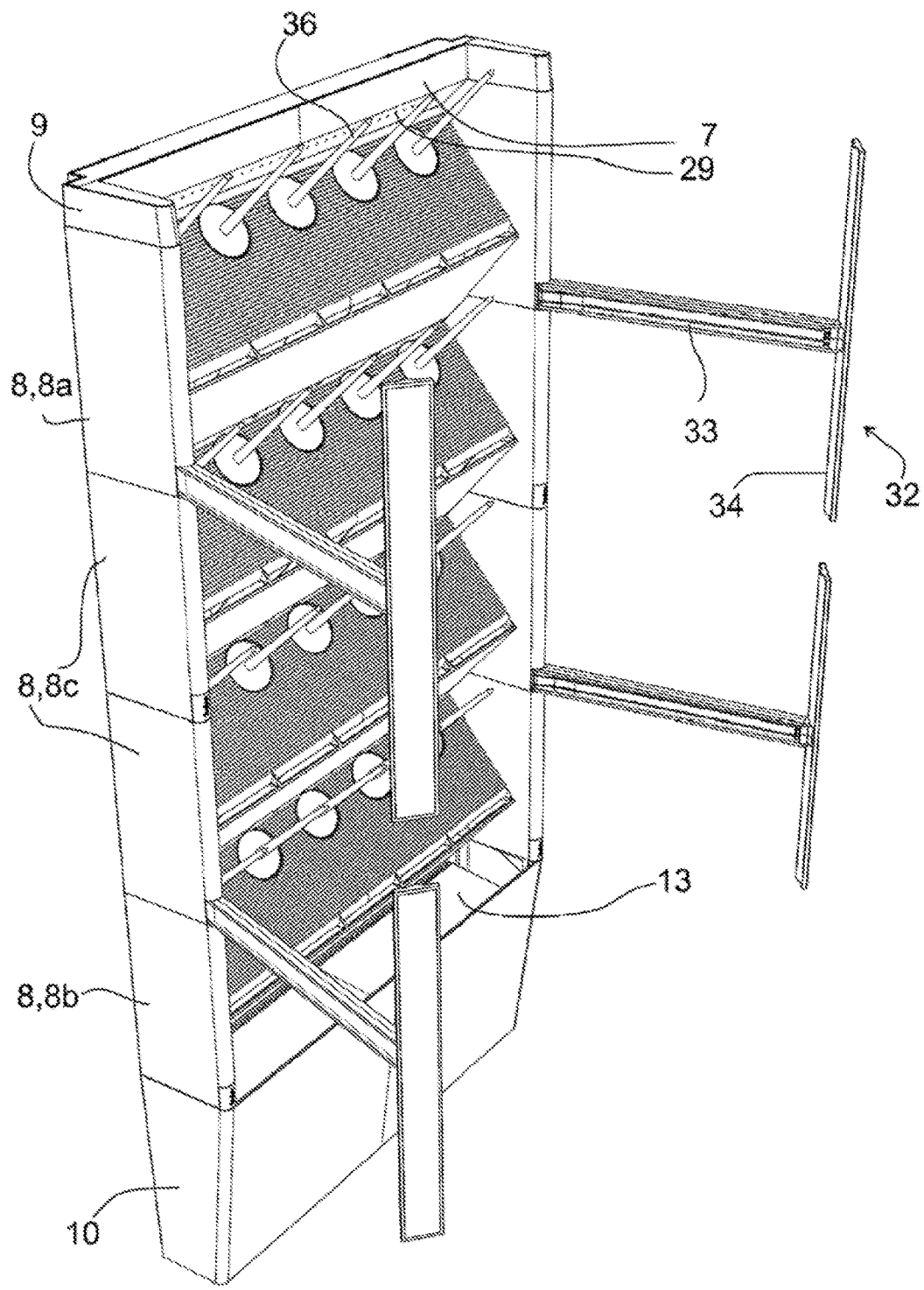
Figure 3:
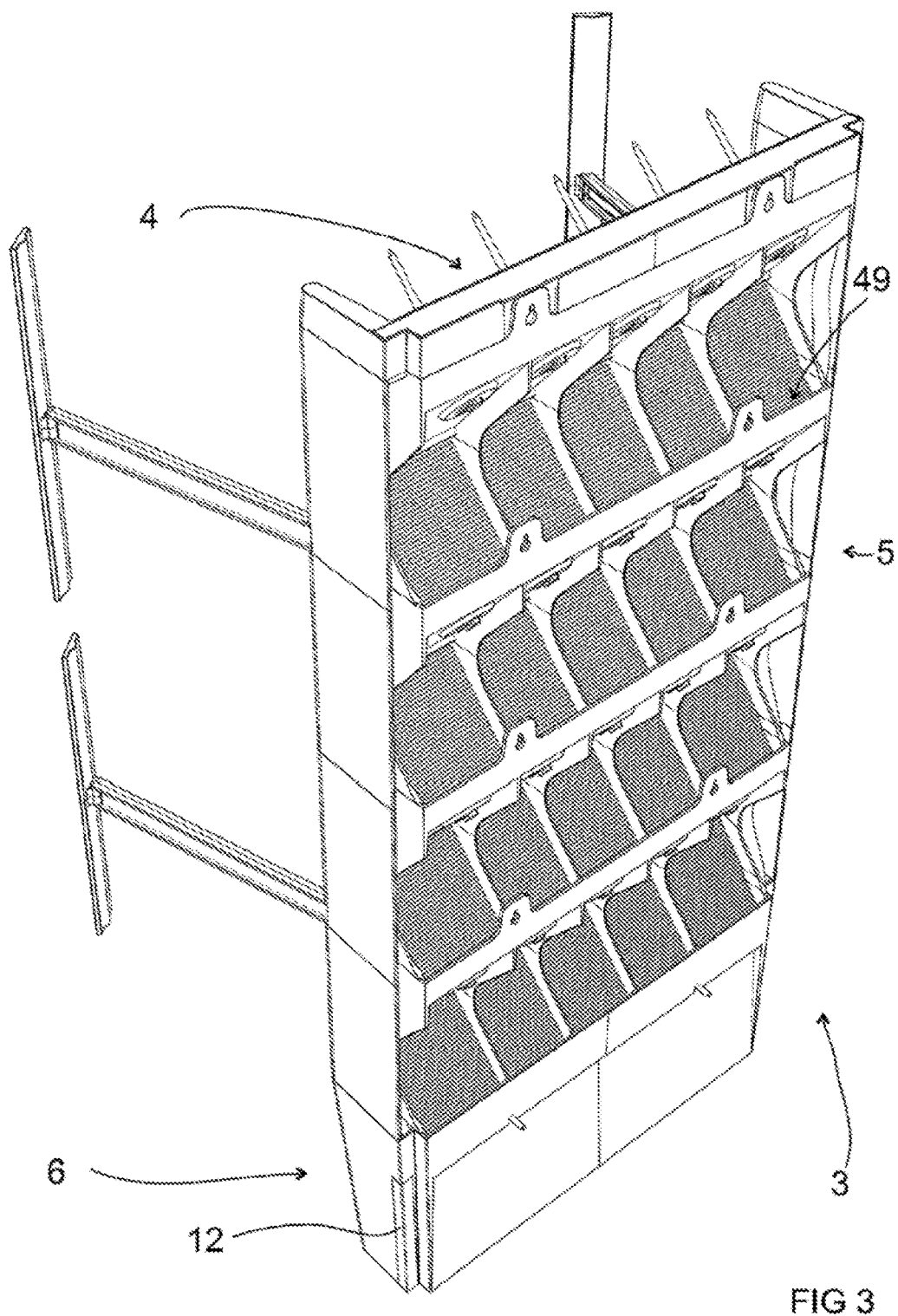
Figure 4:
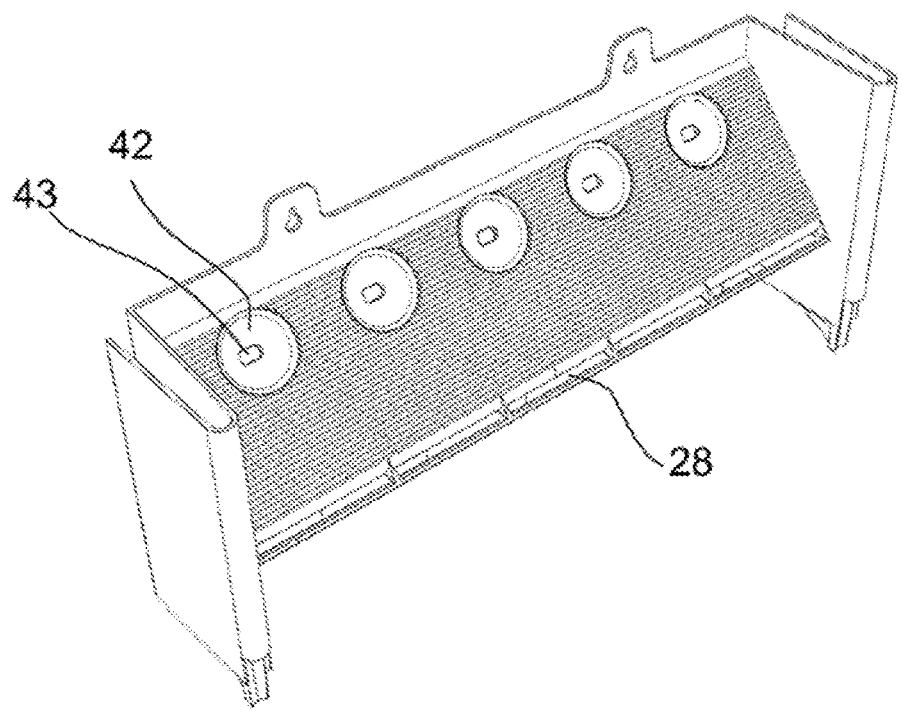
Figure 5:
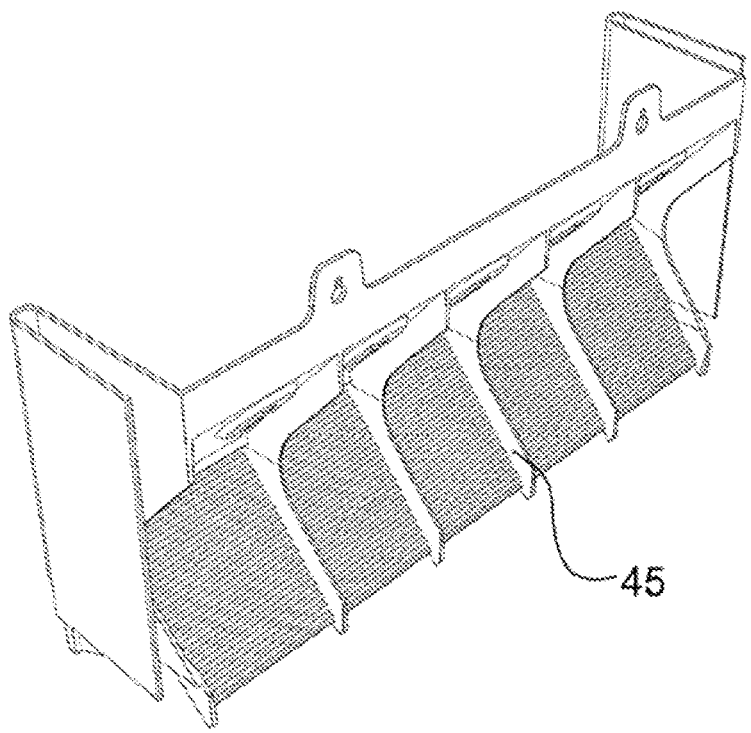
Figure 6:
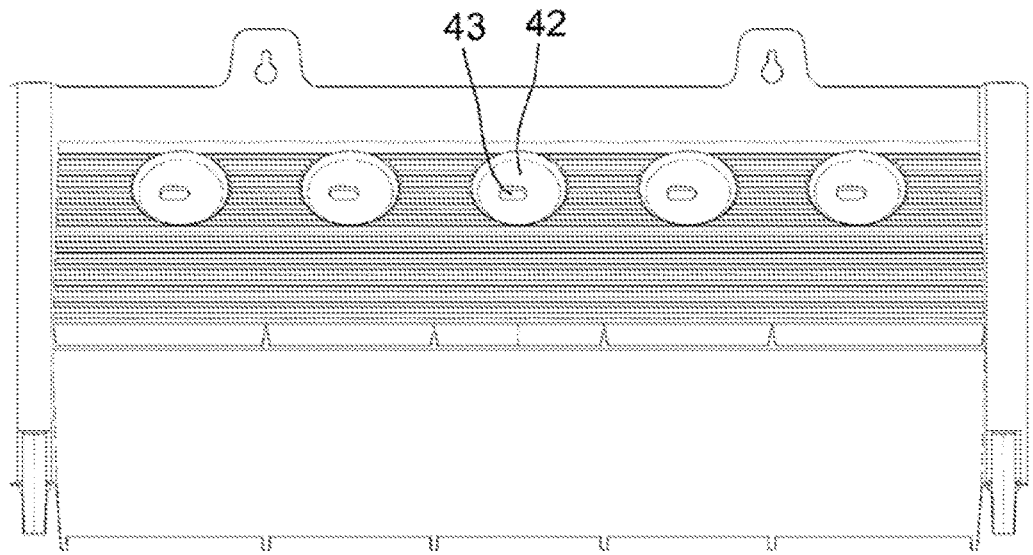
Figure 7:
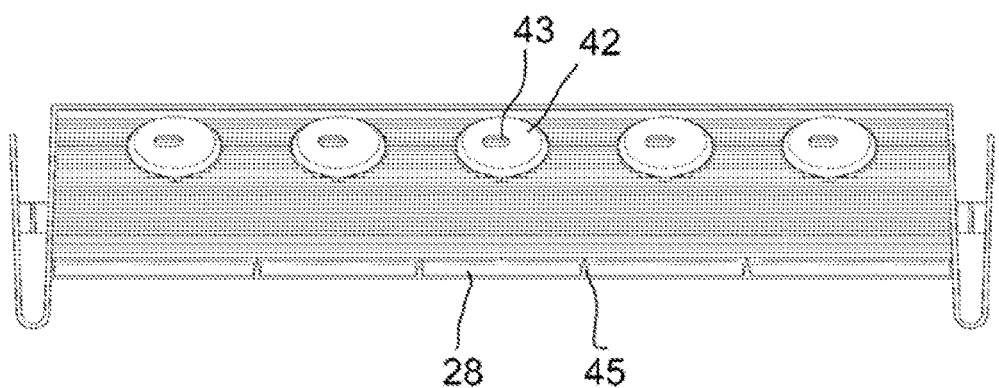
Figure 8:
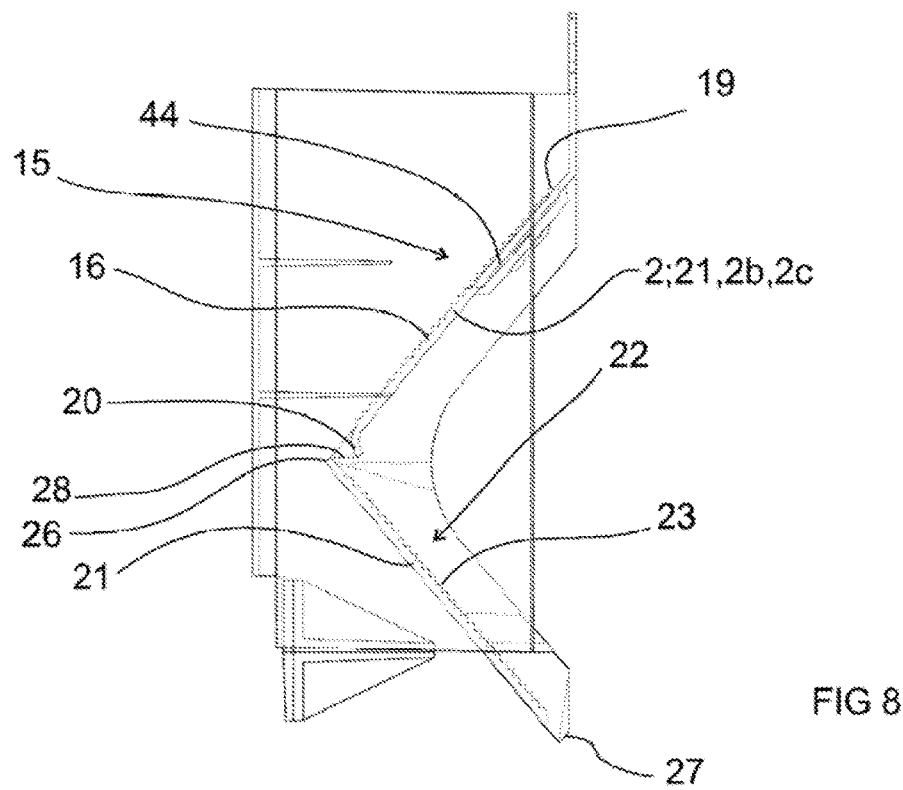
Figure 9:
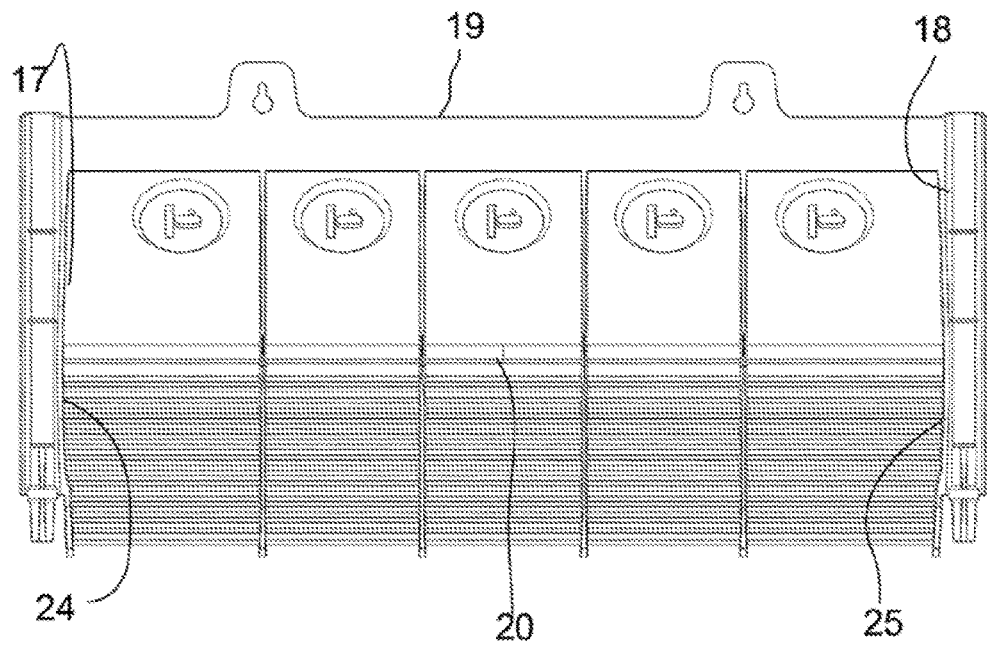
Figure 10:
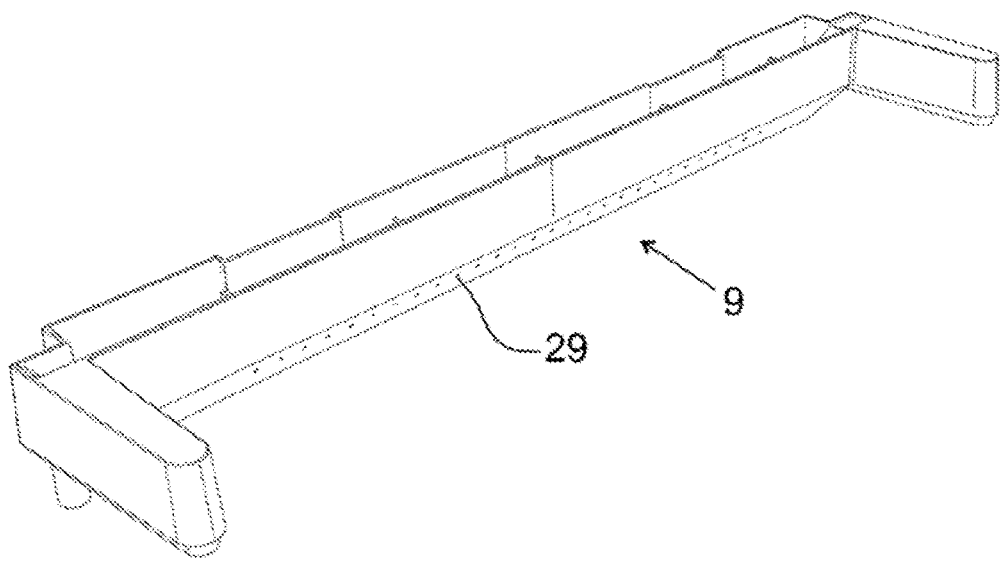
Figure 11:
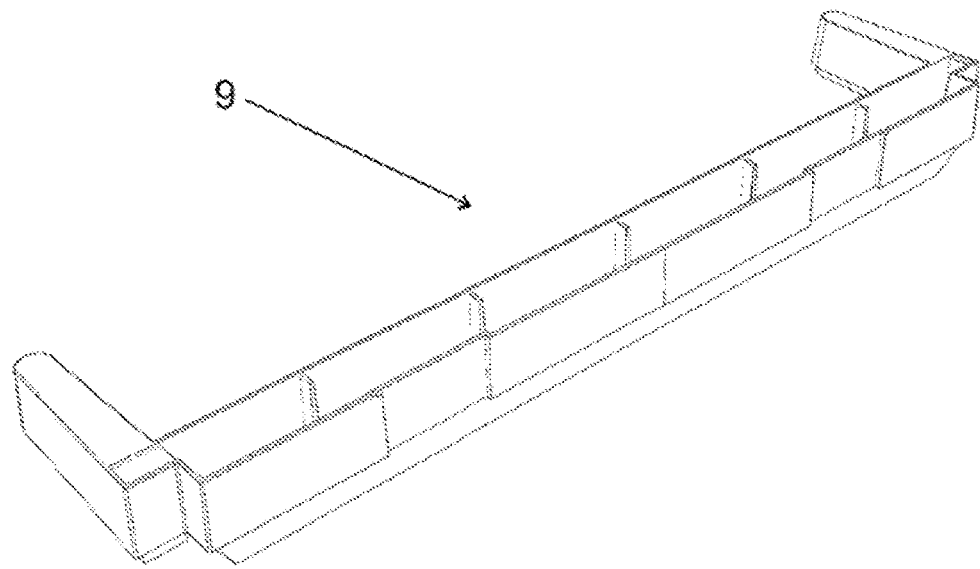
Figure 12:
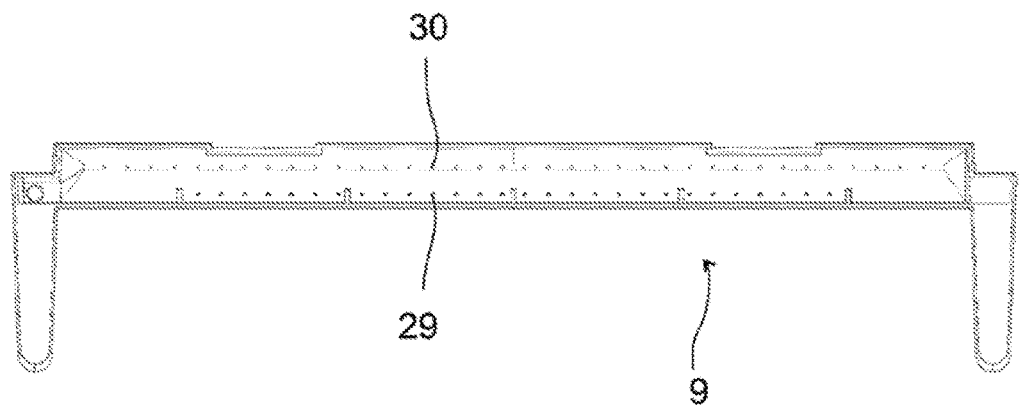
Figure 13:
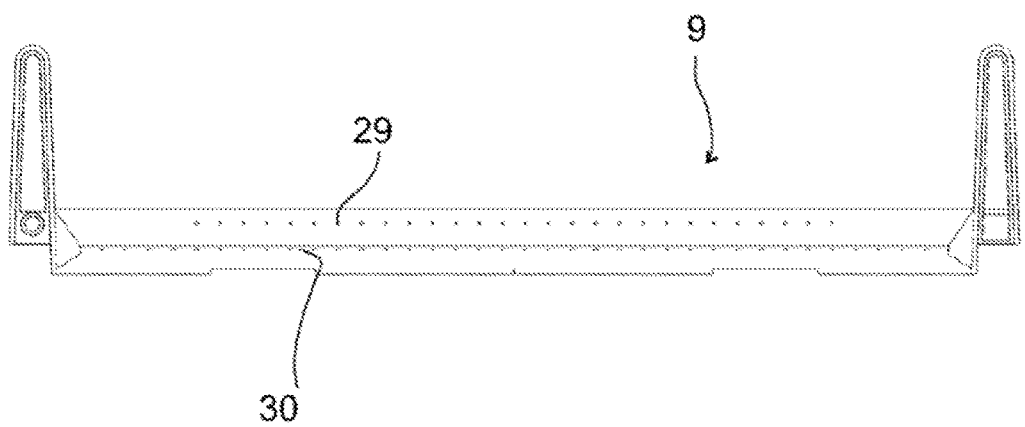
Figure 14:
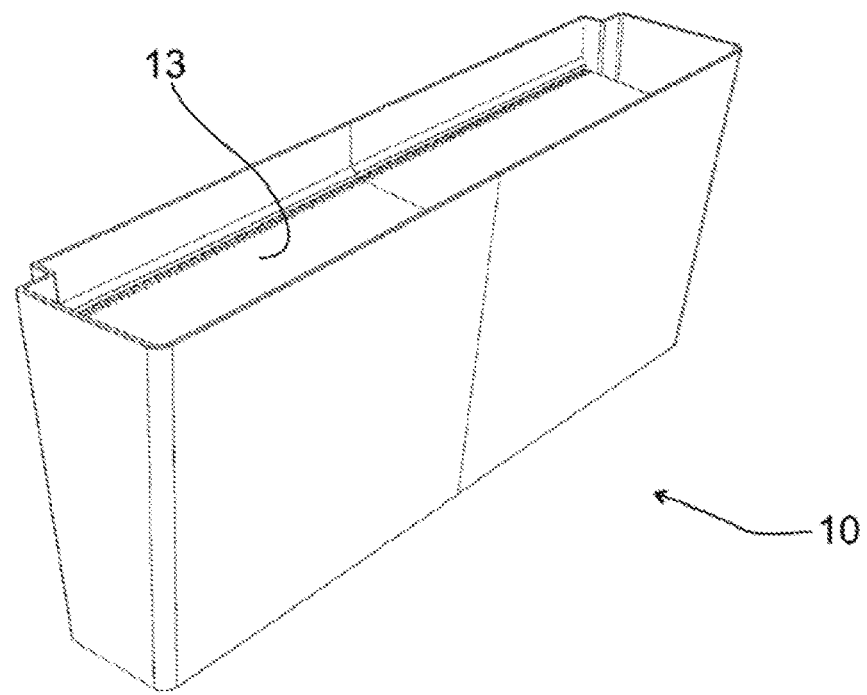
Figure 15:
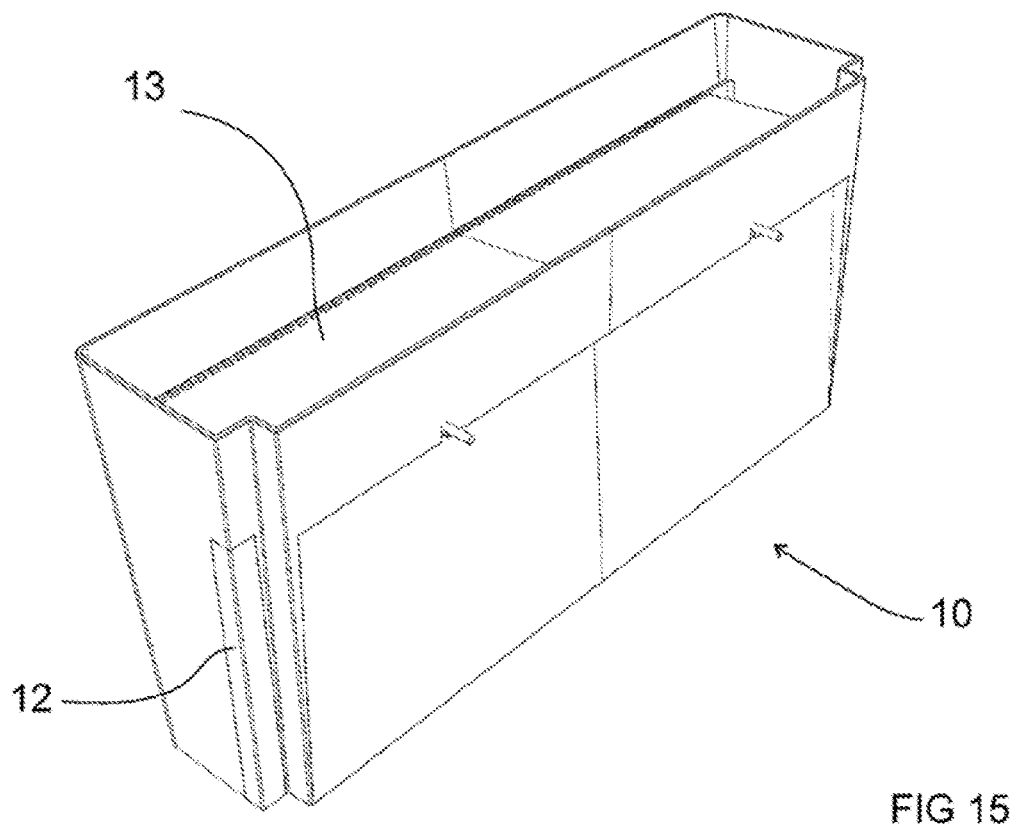
Figure 16:
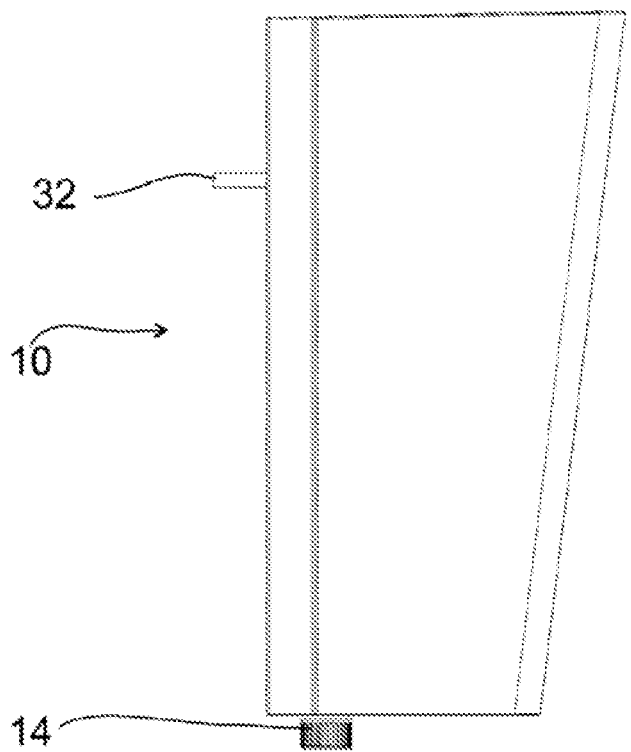
Figure 17:
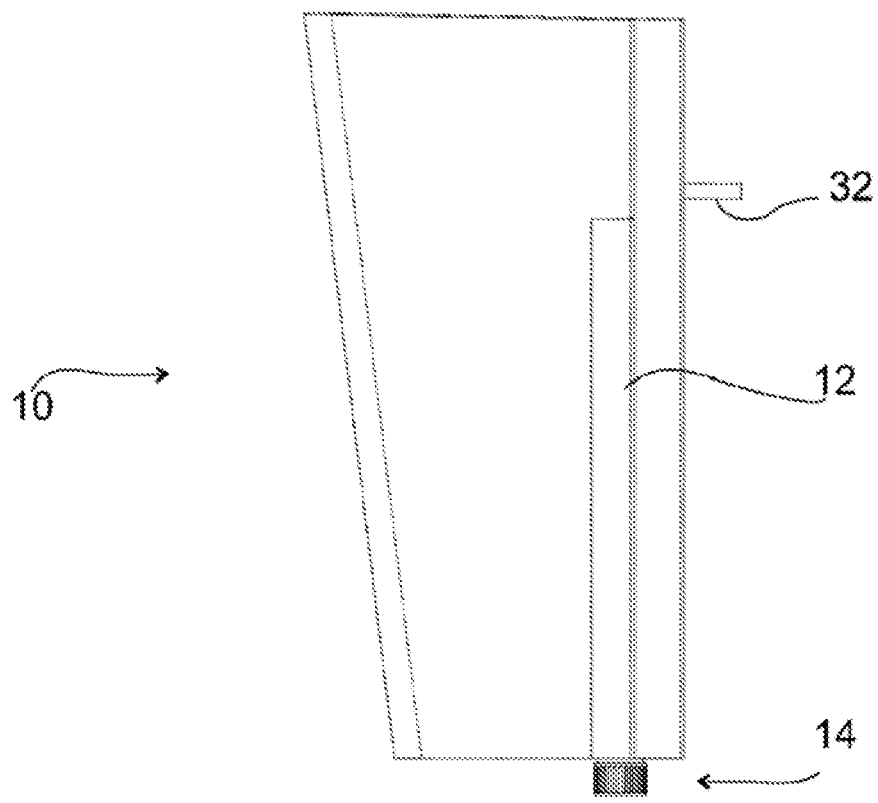
Figure 18:
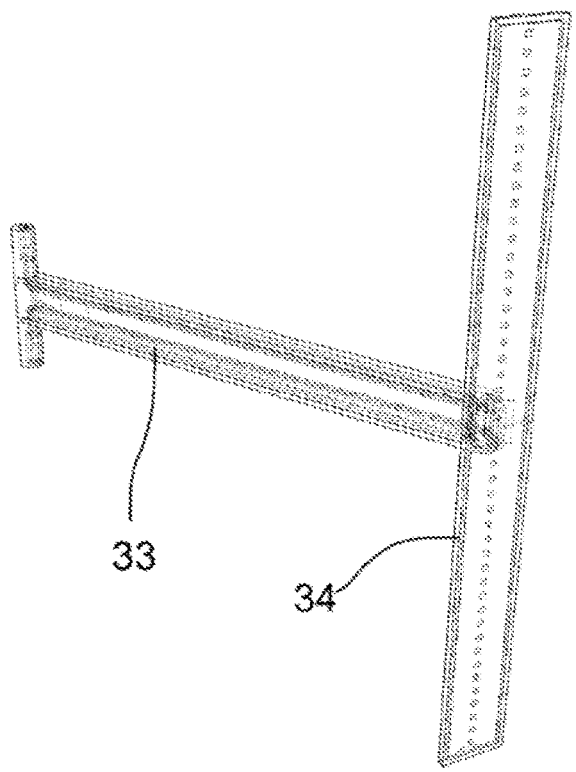
Figure 19:
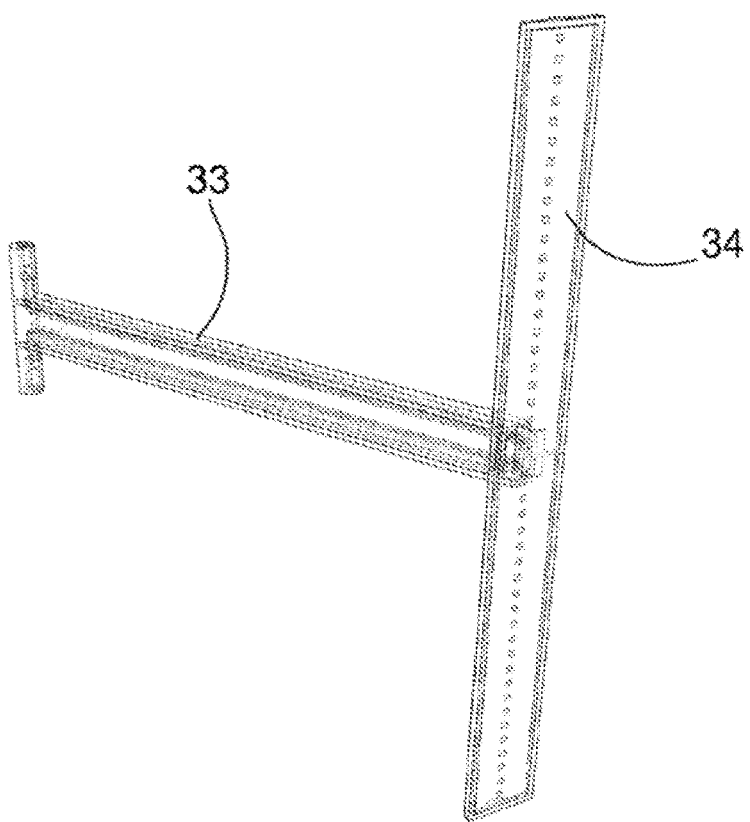
Figure 20:
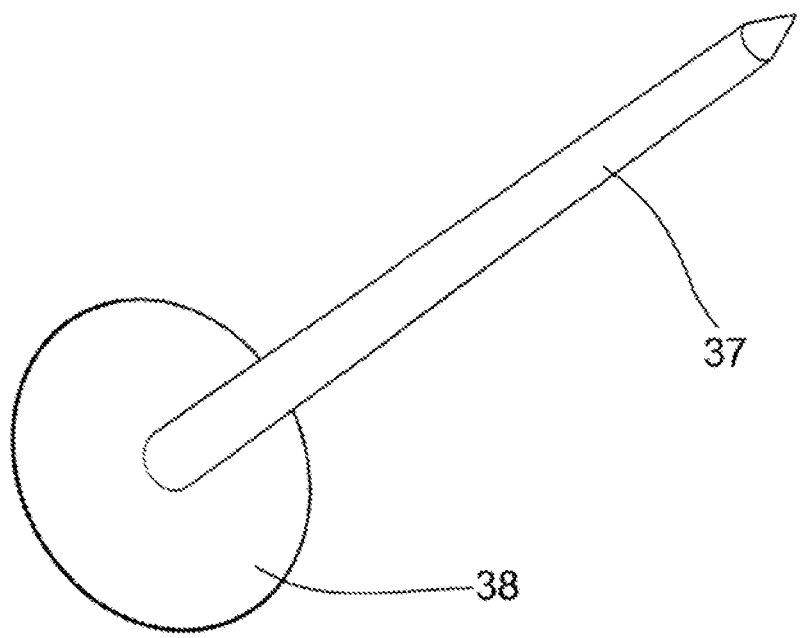
Figure 21:
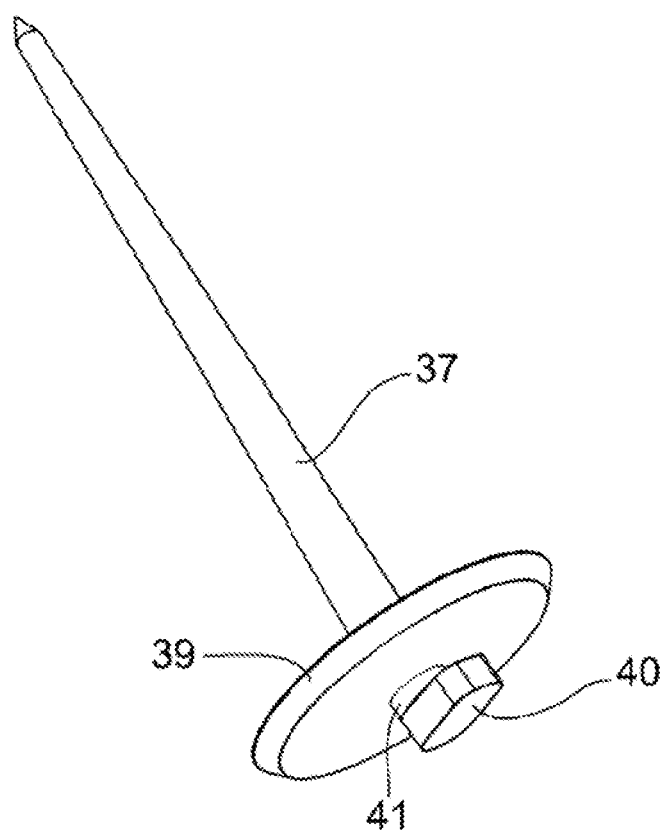
Figure 22:
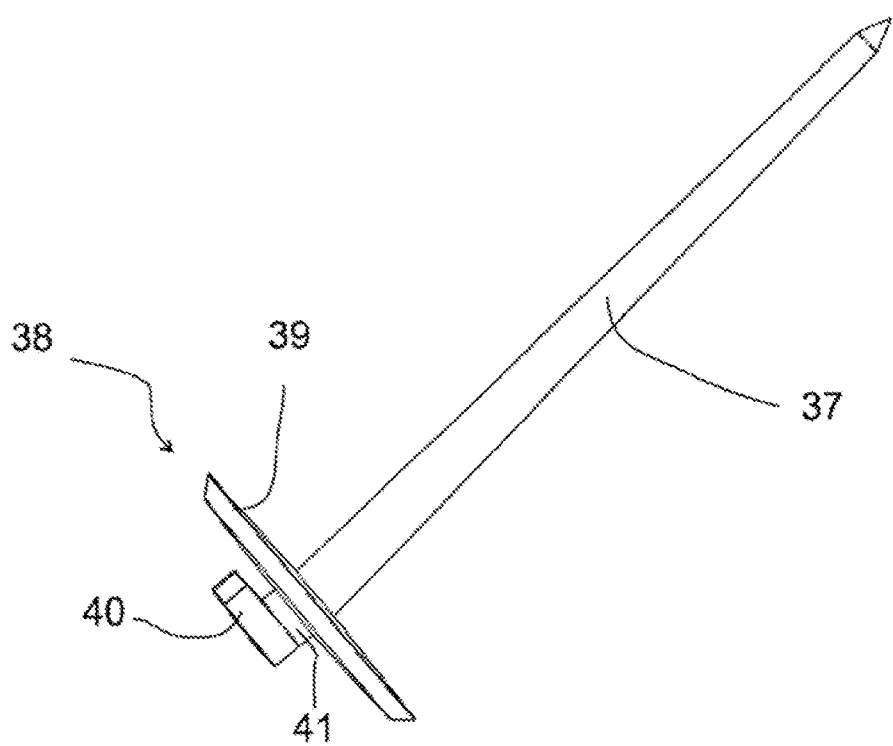
Figure 23:
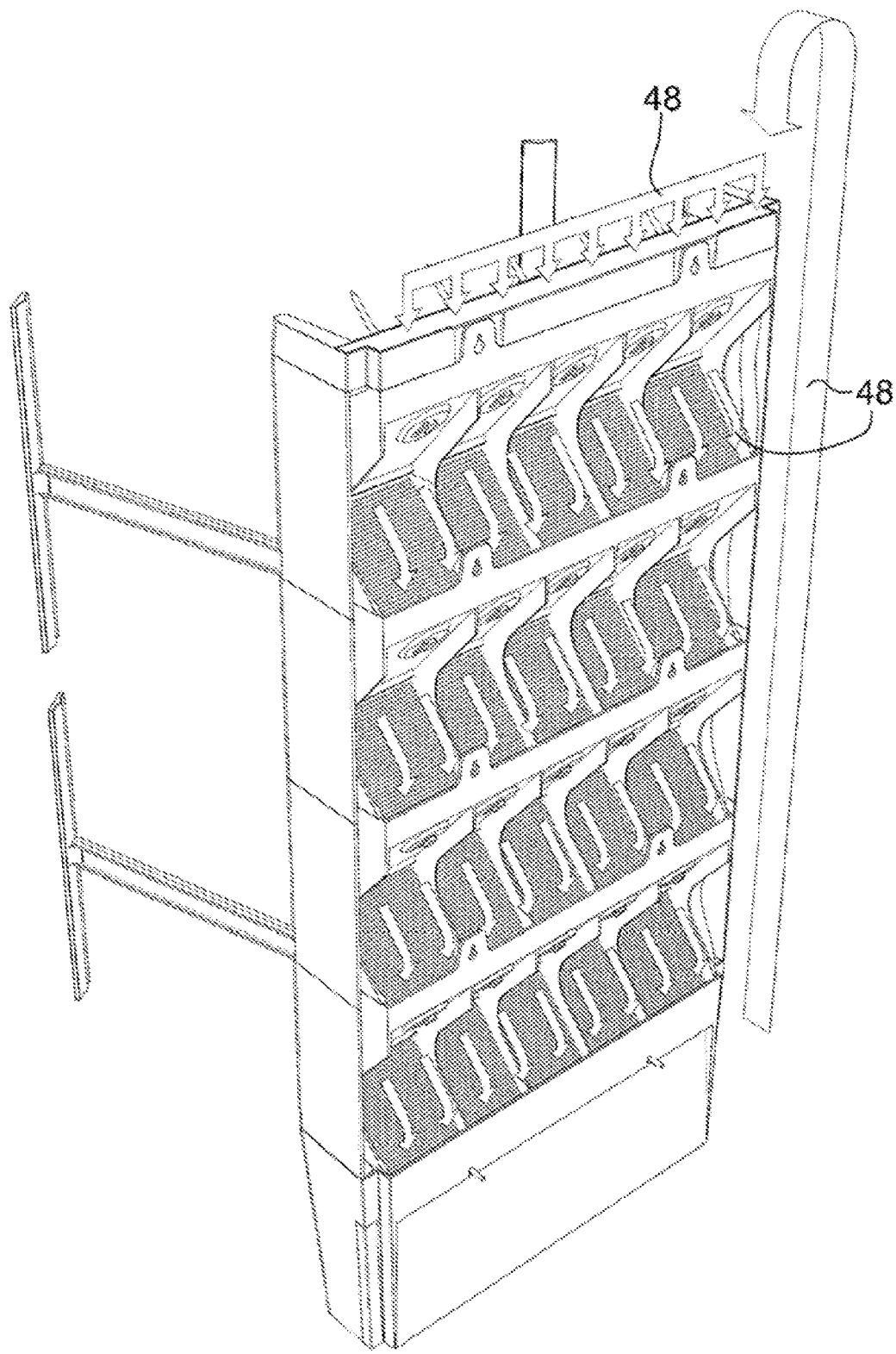
Figure 24:
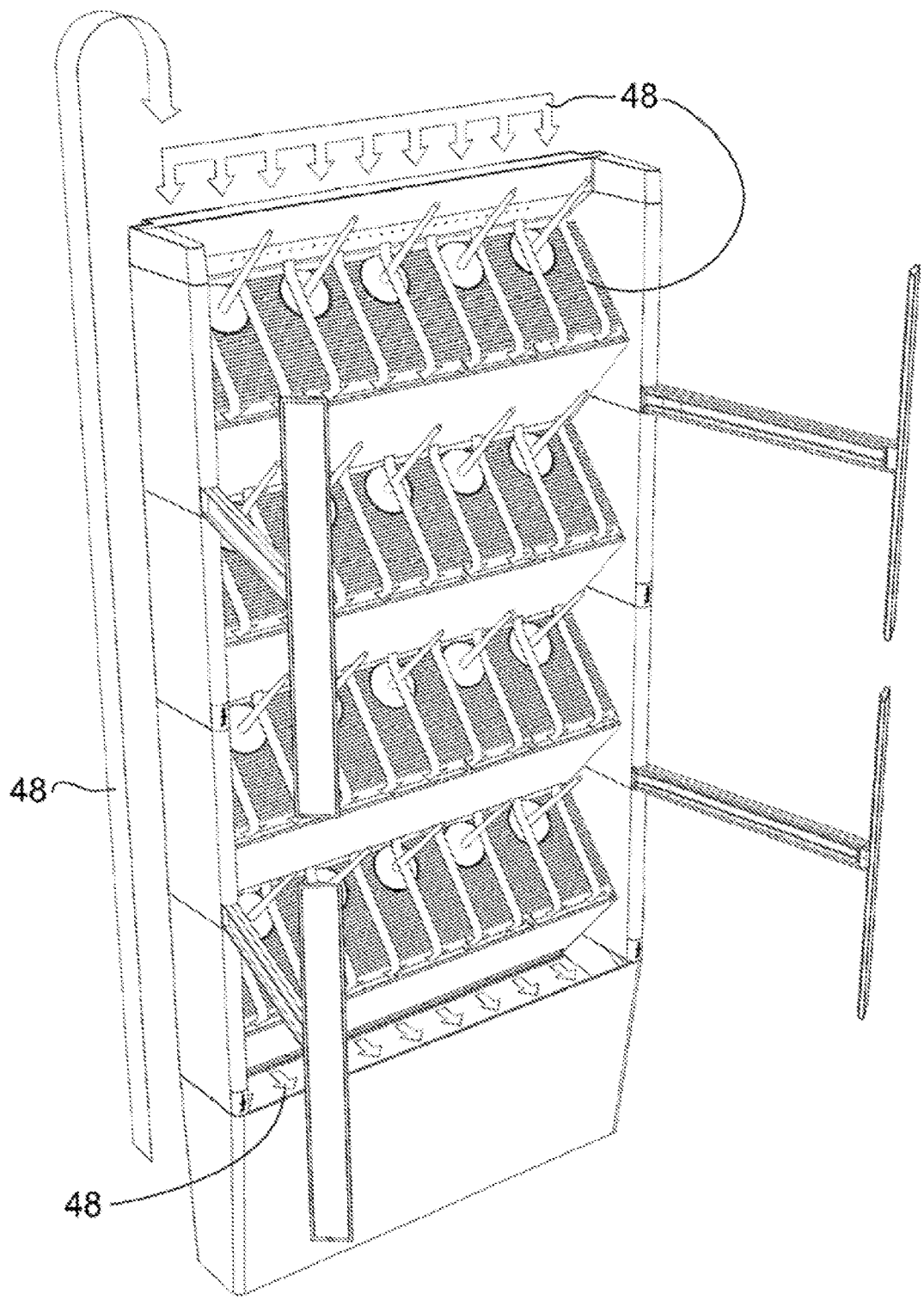
Figure 25:
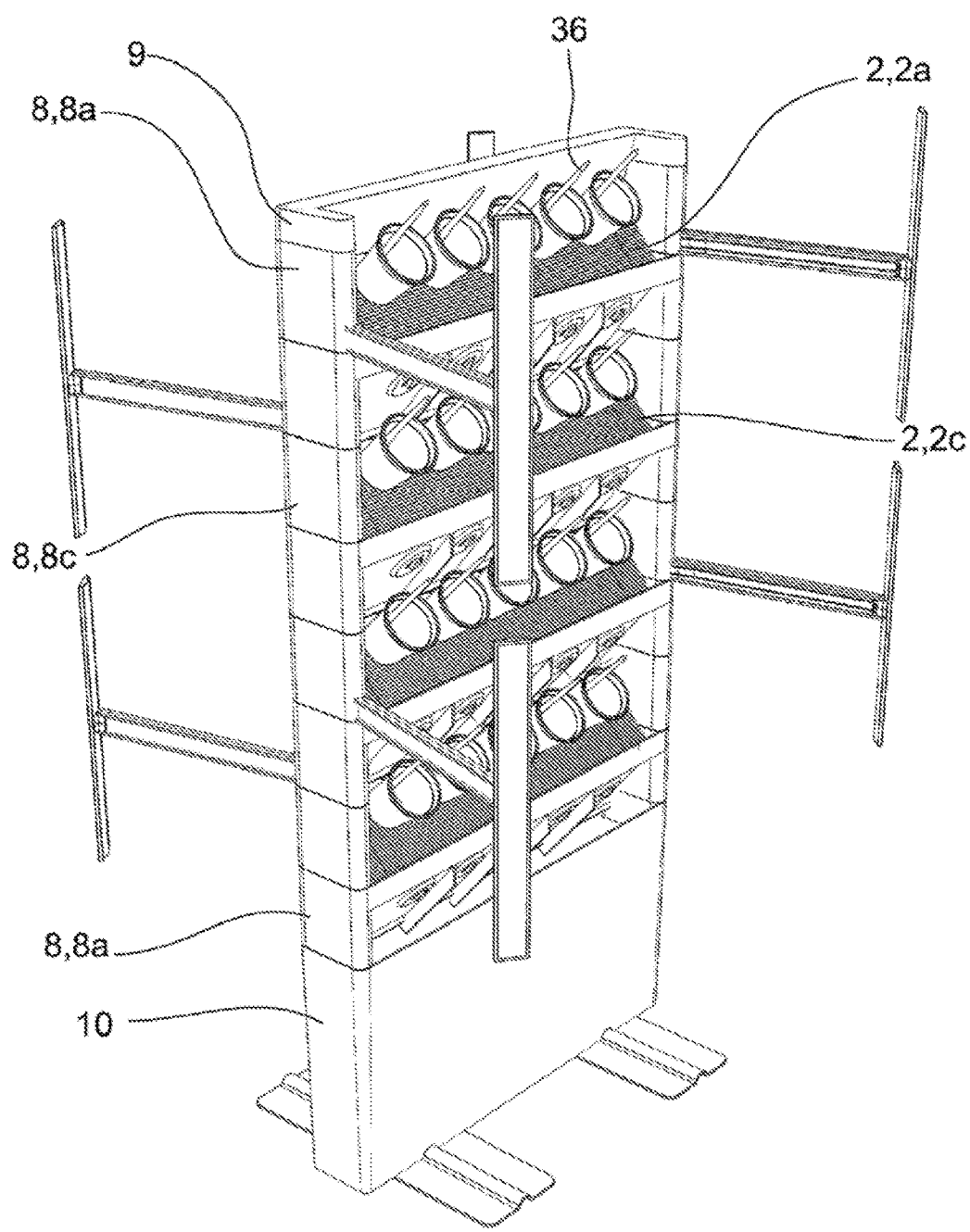
Figure 26:
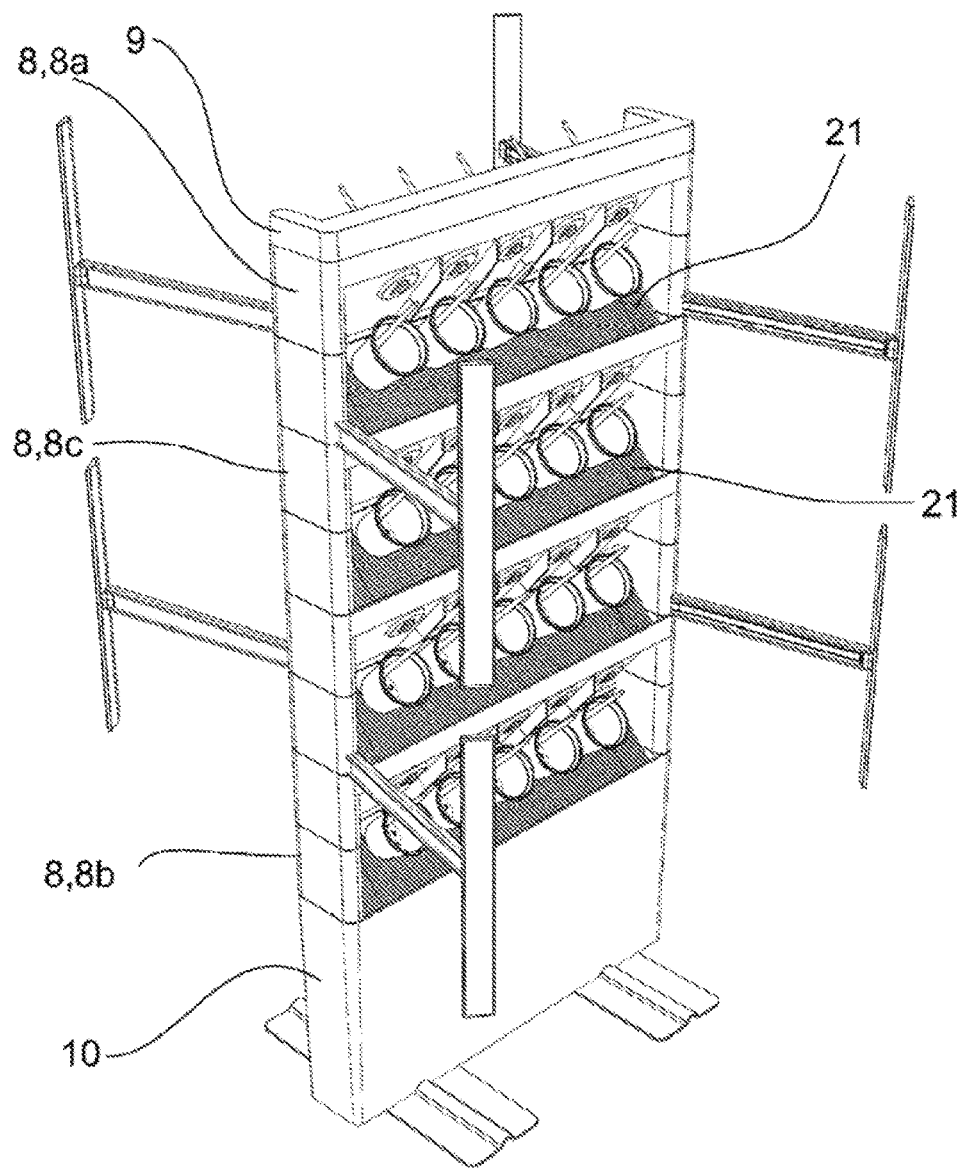
Figure 27:
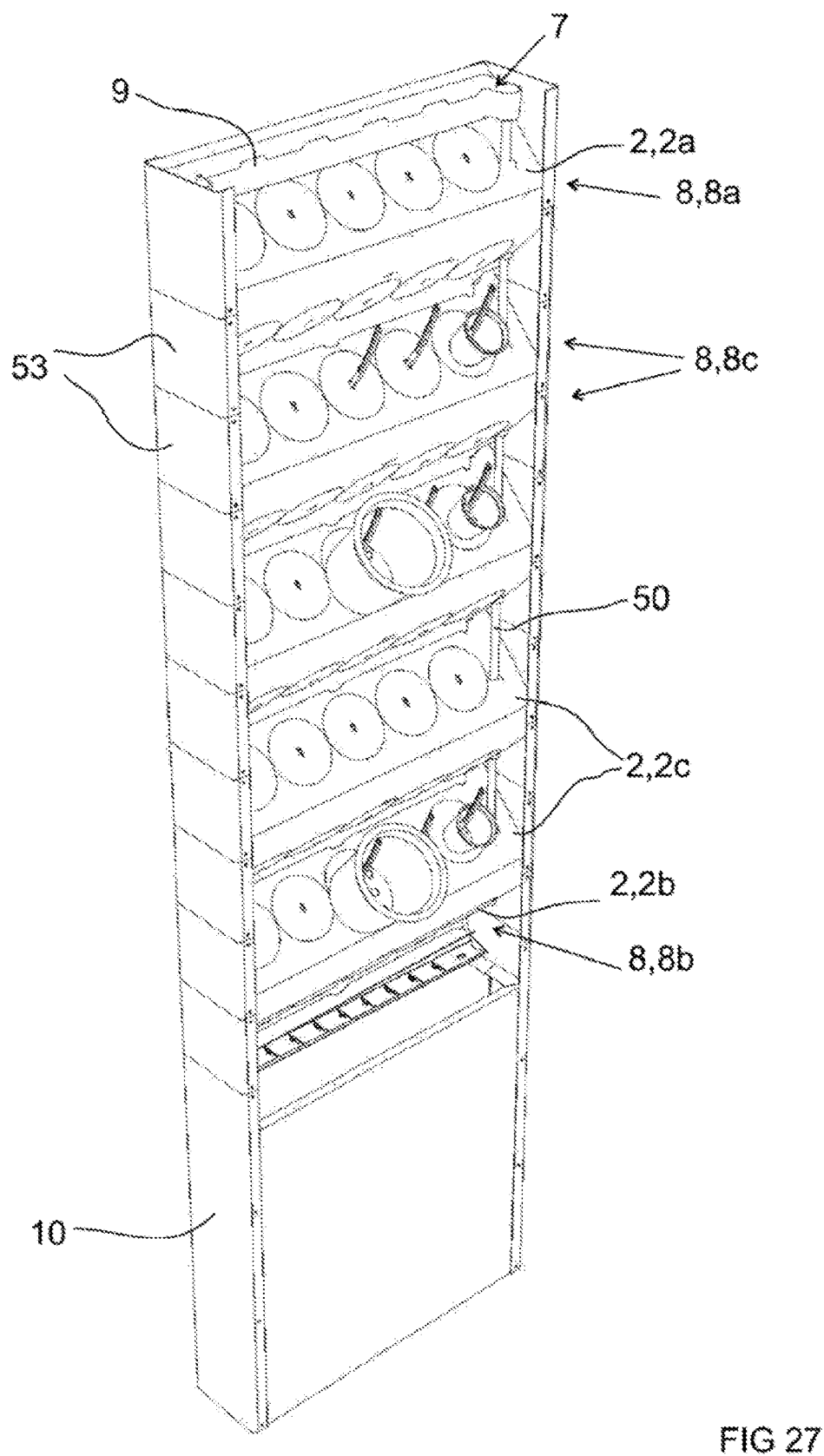
Figure 28:
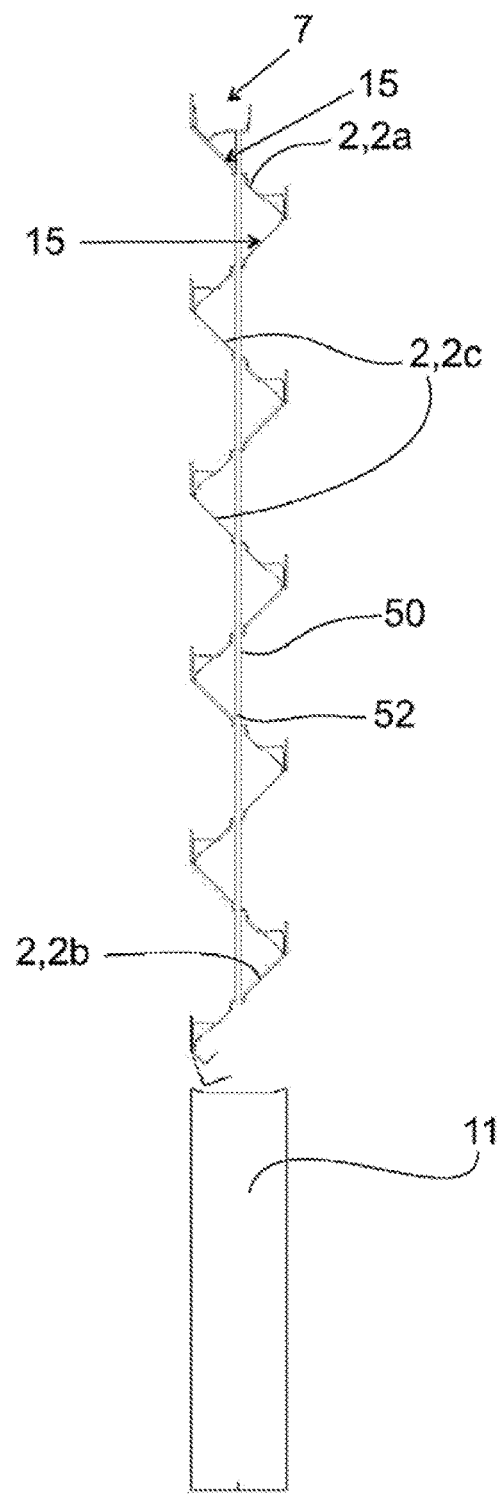
Figure 30:
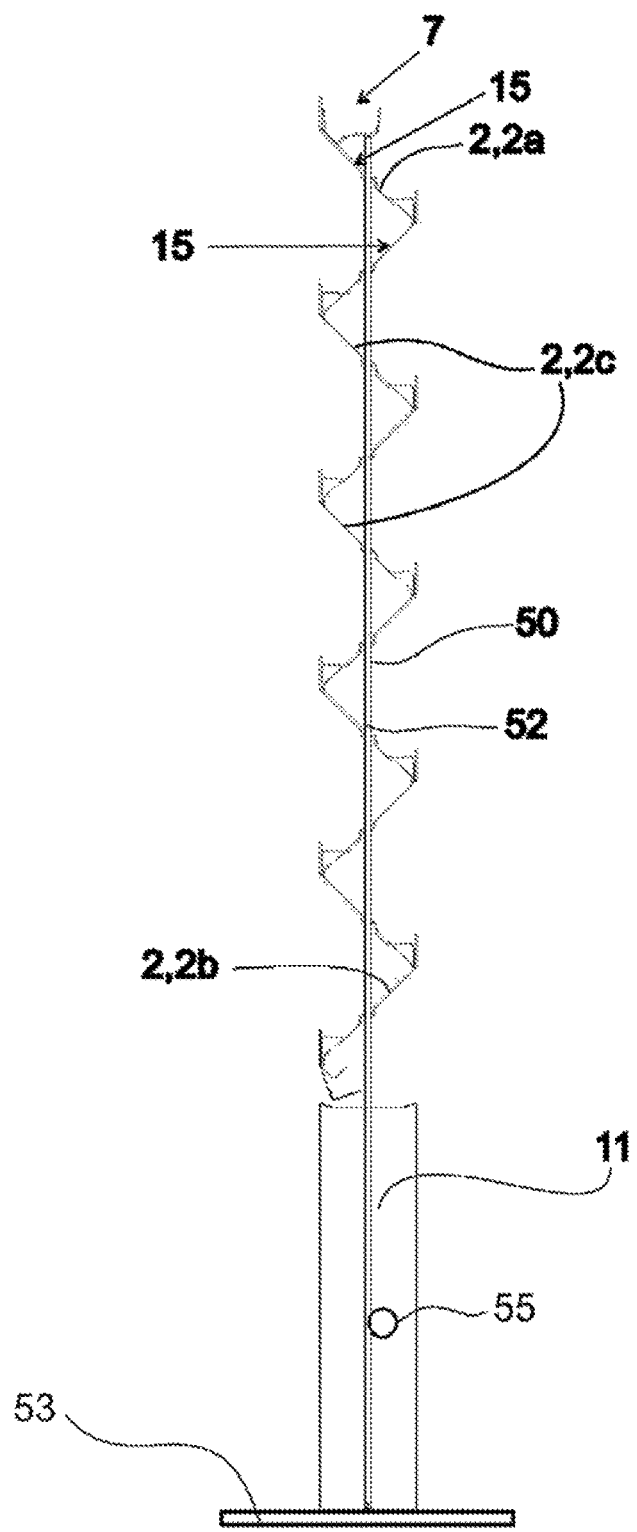
Figure 31:
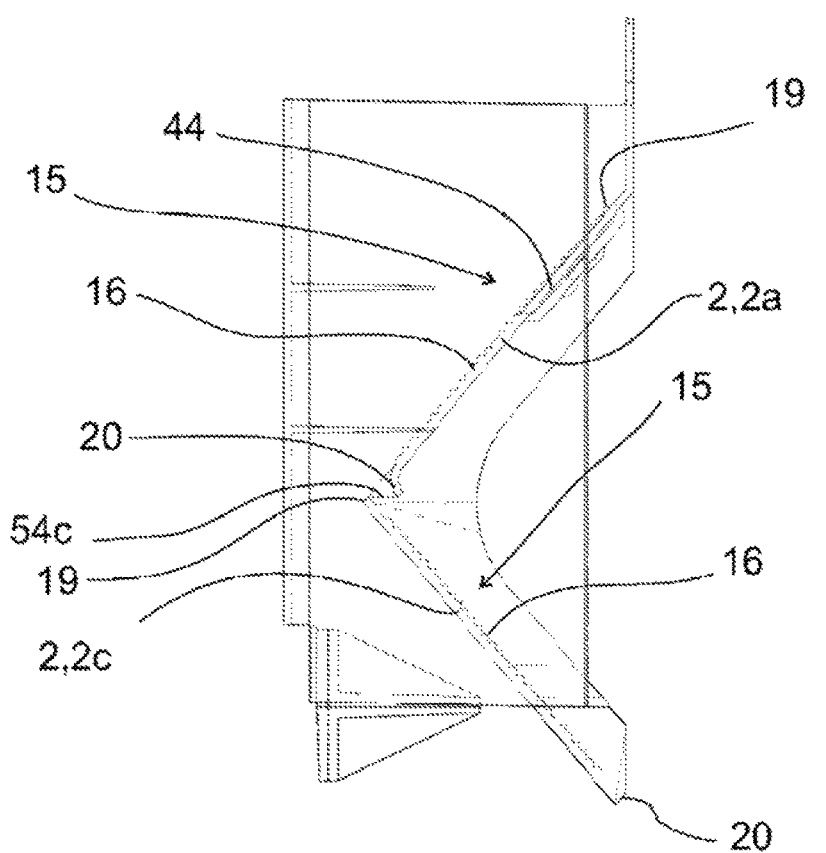
Figure 32:
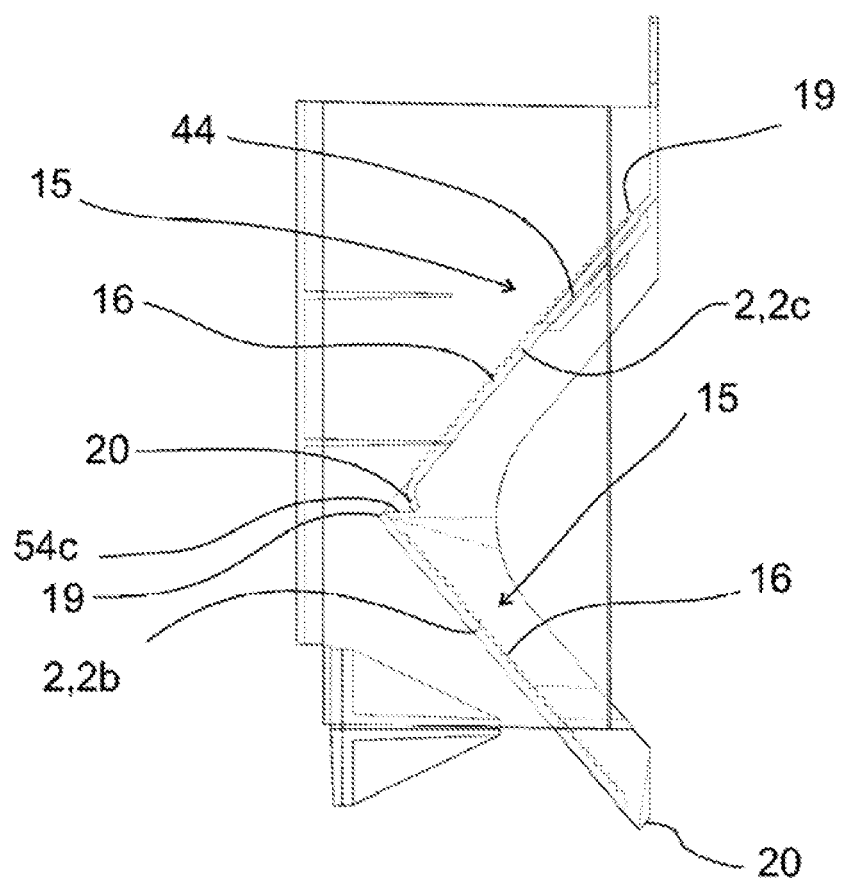
Figure 33:
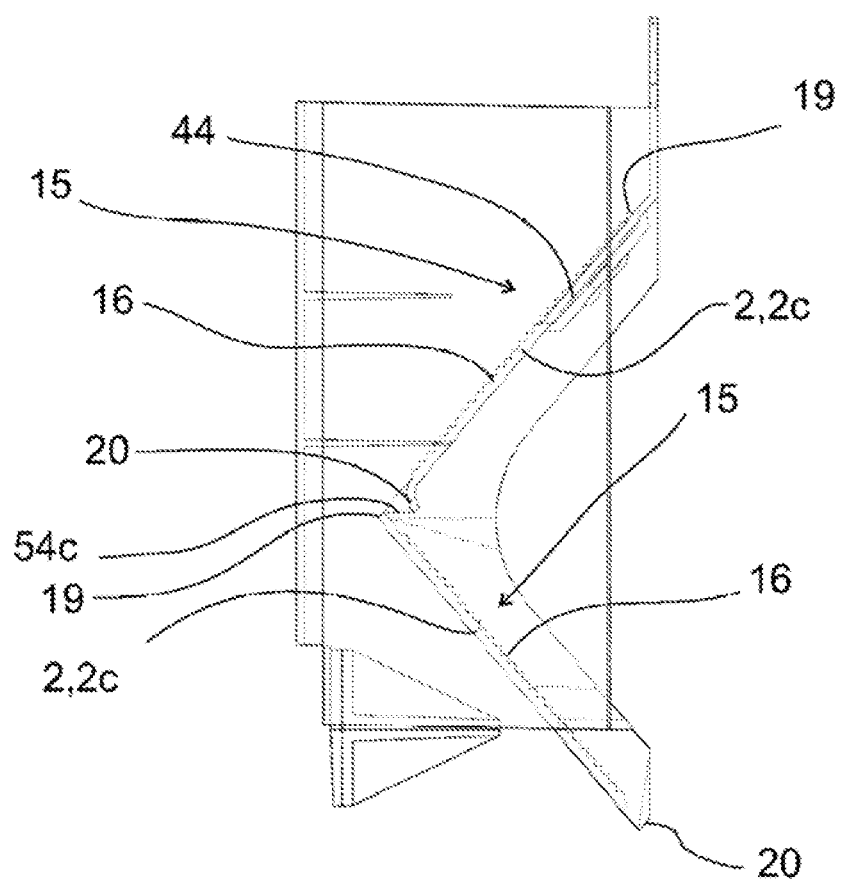

In the following the invention will described in more detail by referring to the figures, which FIG. 1 shows a vertical planter according to a first embodiment, which vertical planter is provided with pots, FIG. 2 shows the vertical planter shown in FIG. 1 without pots, FIG. 3 shows the vertical planter shown in FIG. 1 as seen from another angle, FIG. 4 shows a growing module of the vertical planter shown in FIG. 1, FIG. 5 shows the growing module shown in FIG. 4 as seen from another angle, FIG. 6 shows the growing module shown in FIG. 4 as seen from a front side, FIG. 7 shows the growing module shown in FIG. 4 as seen from a top side, FIG. 8 shows the growing module shown in FIG. 4 as cut along line A-A in FIG. 1, FIG. 9 shows the growing module shown in FIG. 4 as seen from a back side, FIG. 10 shows a nutrient delivering module of the vertical planter shown in FIG. 1, FIG. 11 shows the nutrient delivering module shown in FIG. 10 as seen from another angle, FIG. 12 shows the nutrient delivering module shown in FIG. 10 as seen from a top side, FIG. 13 shows the nutrient delivering module shown in FIG. 10 as seen from a bottom side, FIG. 14 shows a nutrient receiving module of the vertical planter shown in FIG. 1, FIG. 15 shows the nutrient receiving module shown in FIG. 14 as seen from another angle, FIG. 16 shows the nutrient receiving module shown in FIG. 14 as seen from a side, FIG. 17 shows the nutrient receiving module shown in FIG. 14 as seen from another side, FIG. 18 shows a lighting device of the vertical planter shown in FIG. 1, FIG. 19 shows the lighting device shown in FIG. 18 as seen from another angle, FIG. 20 shows a bayonet of the vertical planter shown in FIG. 1, FIG. 21 shows the bayonet shown in FIG. 20 as seen from another angle, FIG. 22 shows the bayonet shown in FIG. 20 as seen from one side, FIG. 23 shows flow of liquid nutrient in a vertical planter shown in FIG. 1, FIG. 24 shows flow of liquid nutrient in a vertical planter shown in FIG. 1, FIG. 25 shows a vertical planter according to a second embodiment, which vertical planter is provided with pots, FIG. 26 shows a vertical planter according to a second embodiment, which vertical planter is provided with pots, FIG. 27 shows a vertical planter according to a third embodiment, which vertical planter is provided with pots, FIG. 28 shows the vertical planter shown in FIG. 27 as cut along a vertical plane, FIG. 28 shows part of the vertical planter shown in FIG. 27, FIG. 30 shows an alternative configuration of the to the section shown in FIG. 28, FIG. 31 shows in section view a detail of an embodiment of the vertical planter, FIG. 32 shows in section view a detail of an embodiment of the vertical planter, and FIG. 33 shows in section view a detail of an embodiment of the vertical planter.

DETAILED DESCRIPTION OF THE INVENTION

The invention relates to a vertical planter (not marked with a reference numeral) for plants (not shown in the drawings).

The vertical planter comprises a frame 1.

The vertical planter comprises a plurality of support planes 2; 2*a*, 2*b*, 2*c* each having a support surface 15 for supporting at least one plant and possible also tissue (not shown in the drawings) such as organic or synthetic tissue at an angle between about 20° and about 60°, preferably at an angle between about 30° and about 50°, more preferably at an angle of about 40° with respect to a normal horizontal plane such as to the earth's normal horizontal plane when the vertical planter is in a normal use position supported at a surface that is essentially parallel with the earth's normal horizontal plane. Said plurality support planes 2 are supported by the frame 1 so that said plurality support planes 2 include an uppermost support plane 2*a* and a lowermost support plane 2*b* and a plurality of intermediate support planes 2*c* positioned vertically between said uppermost support plane 2*a* and said lowermost support plane 2*b*.

The support planes 2 are preferably, but not necessarily, identical and located at identical angles at the frame 1 and vertically above each other at the frame 1 so that each mutual distance between two adjacent support planes 2 is essentially the same.

Alternatively, the support planes 2 can be identical and located at the frame 1 vertically above each other at the frame 1 so that every other support plane 2 is located at or inclined by a first angle at the frame 1 with respect to a vertical plane and so that the rest of said plurality of support planes 2 are located at or inclined by a second angle at the frame 1 with respect to the vertical plane, wherein the first angle and the second angle are opposite angles to each other with respect to the vertical plane, and so that the mutual distance between every other support plane 2 of said plurality of support planes 2 is essentially the same and so that the mutual distance between said rest of said plurality of support planes 2 is essentially the same.

The vertical planter comprises a nutrient supply system 3 that implements hydroponic technique such as nutrient film technique (NFT).

The nutrient supply system 3 includes a nutrient distribution means 4 for distributing liquid nutrient 48 such as water to the support surface 15 of the uppermost support plane 2*a*) to form a film of liquid nutrient (not shown in the drawings) on at least a part of the support surface 15 of the uppermost support plane 2*a* so as to deliver liquid nutrient 48 to a plant or plants supported on the support surface 15 of the uppermost support plane 2*a*.

The nutrient distribution means 4 is located vertically at least partly above said uppermost support plane 2*a*.

The nutrient supply system 3 includes a nutrient conducting arrangement 5 for conducting liquid nutrient 48 from said uppermost support plane 2*a* to said lowermost support plane 2*b* via the support surfaces 15 of each intermediate support plane 2*c* so as to form a film of liquid nutrient on at least a part of the support surface 15 of the lowermost support plane 2*b* to deliver liquid nutrient 48 to a plant or plants supported on the support surface 15 of the lowermost support plane 2*b* and so as to form a film of liquid nutrient on at least a part of the support surface 15 of each intermediate support plane 2*c* to deliver liquid nutrient 48 to a plant or plants supported on the support surface 15 of intermediate support planes 2*c*.

The nutrient supply system 3 includes a nutrient receiving means 6 for receiving liquid nutrient 48 from the support surface 15 of the lowermost support plane 2*b*.

The nutrient distribution means 4 comprises a liquid nutrient reservoir 7 comprising a first set of holes 29 for distributing liquid nutrient 48 from the nutrient reservoir 7 to the support surface 15 of the uppermost support plane 2*a*.

The vertical planter may be made at least partly or fully of polymer.

Modularity

The vertical planter can, as in the first embodiment illustrated in FIGS. 1 to 24 and in the second embodiment illustrated in FIGS. 24 and 25, comprise a plurality of identical growing modules 8, 8*a*, 8*b*, 8*c* each comprising a part of said frame 1 i.e. a frame part and at least one support plane 2, 2*a*, 2*b*, 2*c*. Each identical growing module 8, 8*a*, 8*b*, 8*c* is releasable attached or releasable attachable to at least one other identical growing module 8, 8*a*, 8*b*, 8*c* so that the vertical planter has or will have an uppermost growing module 8*a* and a lowermost growing module 8*b*. The vertical planter may, as shown in FIGS. 1 to 3 and in FIGS. 25 and 26, comprise at least one intermediate grooving module 8*c* between said uppermost growing module 8*a* and said lowermost growing module 8*b*.

If the vertical planter comprises a plurality of identical growing modules 8, 8*a*, 8*b*, 8*c* each comprising a part of said frame 1 i.e. a frame part and at least one support plane 2, 2*a*, 2*b*, 2*c*, the vertical planter may, as shown in FIGS. 1 to 3 and in FIGS. 25 and 26, comprise a nutrient delivering module 9, which comprises a part of said frame 1 i.e. a frame part and the nutrient reservoir 7 of the nutrient distribution means 4 of the nutrient supply system 3, and which nutrient delivering module 9 is releasable attached or is releasable attachable on top of the uppermost growing module 8*a* of said plurality of growing modules 8, 8*a*, 8*b*, 8*c*.

If the vertical planter comprises a plurality of identical growing modules 8, 8*a*, 8*b*, 8*c* each comprising a part of said frame 1 i.e. a frame part and at least one support plane 2, 2*a*, 2*b*, 2*c*, the vertical planter may, as shown in FIGS. 1 to 3 and in FIGS. 25 and 26, comprise a nutrient receiving module 10, which comprises a part of said frame 1 i.e. a frame part and said nutrient receiving means 6 of the nutrient supply system 3, and which is releasable attached or which is releasable attachable under the lowermost growing module 8*b* of said plurality of growing modules 8, 8*a*, 8*b*, 8*c*.

Figure 29:
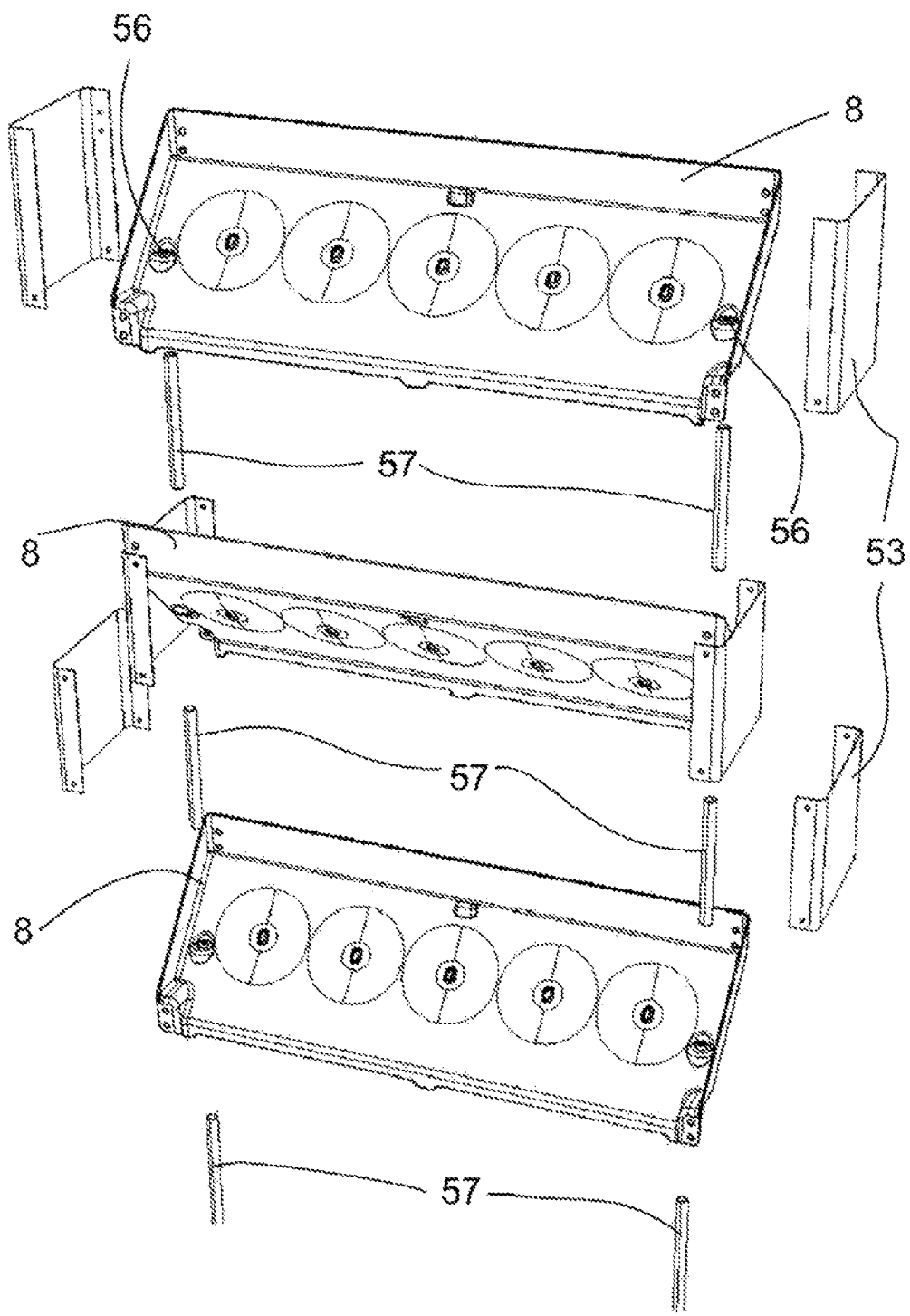

The frame 1 of the vertical planter can, as in the third embodiment shown in FIGS. 27 to 29 comprise at least one pipe 50 extending between the nutrient receiving means 6 and the nutrient distribution means 4 so that said plurality of support planes 2; 2*a*, 2*b*, 2*c* are supported at said at least one pipe 50. Said plurality of support planes 2; 2*a*, 2*b*, 2*c* are preferably, but not necessarily, supported at said at least one pipe 50 so that said plurality of support planes 2; 2*a*, 2*b*, 2*c* are releasable fastened to said at least one pipe 50. Alternatively, said plurality of support planes 2; 2*a*, 2*b*, 2*c* may be supported at said at least one pipe 50 so that said plurality of support planes 2; 2*a*, 2*b*, 2*c* are releasable fastened to said at least one pipe 50 and so that said plurality of support planes 2; 2*a*, 2*b*, 2*c* are additionally supported on each other, i.e. so that the upper support planes 2; 2*a*, 2*b*, 2*c* are supported on the lower support planes 2; 2*a*, 2*b*, 2*c*. Said at least one pipe 50 may penetrate an aperture 56 in at least one of said plurality of support planes 2; 2*a*, 2*b*, 2*c*. In the third embodiment shown in FIGS. 27 to 29, the vertical planter comprises two pipes 50 and the two pipes 50 penetrates each support plane of said plurality of support planes 2; 2*a*, 2*b*, 2*c*. Said at least one pipe 50 is preferably, but not necessarily, essentially linear, and said frame 1 comprises preferably, but not necessarily a floor stand 3 to which said at least one pipe 50 is fastened, preferable releasable fastened, in a vertical position. The floor stand 53 is preferably, but not necessarily, arranged vertically below said nutrient receiving means 6. The floor stand 53 may be formed by a nutrient receiving module 10 that comprises the nutrient receiving means 6 of the nutrient supply system 3 and that is arranged at least partly under the lowermost growing module 8*b*, if the vertical planter is provided with such nutrient receiving module 10. If the frame 1 of vertical planter comprises at least one pipe 50, the nutrient supply system 3 comprises preferably, but not necessarily, a fluid channel 52 in said at least one pipe 50, so that said fluid channel 52 is in fluid connection with the nutrient receiving means 6 and in fluid connection with the nutrient distribution means 4 for leading liquid nutrient 48 from the nutrient receiving means 6 to the nutrient distribution means 4, and the nutrient supply system 3 comprises preferably, but not necessarily, a pump means 55 for pumping liquid nutrient 48 from the nutrient receiving means 6 to the nutrient distribution means 4 in said fluid channel 52. Said at least one pipe 50 is preferably, but not necessarily, composed of several pipe sections 57 forming said at least one pipe 50, as shown in FIG. 29.

If the frame 1 of vertical planter comprises at least one pipe 50 as described above, the vertical planter comprises preferably, but not necessarily, a plurality of identical growing modules 8; 8*a*, 8*d*, 8*c* each comprising at least one support plane 2; 2*a*, 2*b*, 2*c* so that each identical growing module 8; 8*a*, 8*d*, 8*c* is releasable attached to said at least one pipe 50 of the frame 1 so that the vertical planter has an uppermost identical growing module 8*a* and a lowermost identical growing module 8*b*.

If the frame 1 of vertical planter comprises at least one pipe 50 as described above, the vertical planter comprises preferably, but not necessarily, a nutrient distributing module 9 comprising the liquid nutrient reservoir 7 of the nutrient distribution means 4 of the nutrient supply system 3 so that the nutrient distributing module 9 is releasable attached to said at least one pipe 50 of the frame 1 least partly vertically above of the uppermost growing module 8*a* of said plurality of growing modules 8; 8*a*, 8*d*, 8*c*.

If the frame 1 of vertical planter comprises at least one pipe 50 as described above, the vertical planter comprises preferably, but not necessarily, a nutrient receiving module 10 comprising said nutrient receiving means 6 of the nutrient supply system 3, so that the nutrient receiving module 10 is releasable attached to said at least one pipe 50 of the frame 1 at least partly vertically below the lowermost growing module 8*b* of said plurality of growing modules 8; 8*a*, 8*d*, 8*c*.

If the frame 1 of vertical planter comprises at least one pipe 50 as described above, the vertical planter comprises preferably, but not necessarily, side plates 53 at opposite ends of said plurality of identical growing modules 8; 8*a*, 8*d*, 8*c* or at opposite ends of said plurality of support planes 2; 2*a*, 2*b*, 2*c*.

Advantages with modularity are that the vertical planter can be stored and transported in disassembled state and that the vertical planter can be scaled up or scaled down.

Nutrient Supply System

The vertical planter the nutrient receiving means 6 of the nutrient supply system 3 can, as in the first embodiment illustrated in FIGS. 1 to 24 and in the second embodiment illustrated in FIGS. 24 and 25, comprise a nutrient tank 11. If the nutrient receiving means 6 of the nutrient supply system 3 comprises such nutrient tank 11, the nutrient tank 11 comprises preferably, but not necessarily, a transparent wall member 12 forming a level meter showing the amount of liquid nutrient 48 in the nutrient tank 11, wherein the transparent wall member 12 is made of green transparent polymer for filtering out wave lengths from light suitable for photosynthesis in the liquid content in the nutrient tank 11.

If the nutrient receiving means 6 of the nutrient supply system 3 comprises such nutrient tank 11, the nutrient tank 11 comprises preferably, but not necessarily, a removable plate member 13 for at least partly covering the content of the nutrient tank 11 and for protecting the content of the nutrient tank 11 against light and/or for supporting the nutrient tank and for preventing the nutrient tank 11 from being deformed by the weight of the liquid nutrient 48 content so that the nutrient tank 11 maintains its dimensions and shape.

If the nutrient receiving means 6 of the nutrient supply system 3 comprises such nutrient tank 11, the nutrient tank 11 comprises preferably, but not necessarily, a drainage opening 14 in a bottom or in a lower region of the nutrient tank 11 for emptying the nutrient tank 11 from its content.

The nutrient conducting arrangement 5 of the nutrient supply system 3 is formed in part by the support surface 15 of each support plane 2.

The support surface 15 of each support plane 2 is preferably, but not necessarily, provided with first steps 16 or other formations (not shown in the figures) to slow down the flow of liquid nutrient 48 on the support surface 15 of the support plane 2.

In the embodiments of the vertical planter shown in the figures, each of the support planes 2 is in the form of an elongate essentially flat plane having a first end side 17 and a opposite second end side 18 and an first upper edge 19 and a first lower edge 20 between the first end side 17 and the second end side 18 so that the first end side 17 and the opposite second end side 18 being essentially parallel and so that the first upper edge 19 and the first lower edge 20 being essentially parallel. In the embodiments of the vertical planter shown in the figures, the support surface 15 of each support plane 2 is provided with first steps 16 to slow down the flow of liquid nutrient 48 on the support surface 15 of the support plane 2, so that the first steps 16 extend in parallel between the first end side 17 and the opposite second end side 18 of the support plane 2. In the embodiments of the vertical planter shown in the figures, the first upper edge 19 and the first lower edge 20 of each support plane 2 are essentially horizontal and have essentially equal length between the first end side 17 and the second end side 18. In the embodiments of the vertical planter shown in the figures, the first end side 17 and the second end side 18 of each support plane 2 have essentially equal length between the first upper edge 19 and the first lower edge 20.

If the support planes 2 of the vertical planter are is in the form of elongate essentially flat planes, as described earlier, the vertical planter may comprise at least one slot 54; 54a, 54b, 54c between the first lower edge 20 of one support plane 2; 2a, 2b, 2c of said plurality of support planes 2; 2a, 2b, 2c and the first upper edge 19 of another support plane 2; 2a, 2b, 2c of said plurality of support planes 2; 2a, 2b, 2c, said another support plane 2; 2a, 2b, 2c being situated below said one support plane 2; 2a, 2b, 2c, for allowing liquid nutrient 48 to flow from the support surface 15 of said one support plane 2; 2a, 2b, 2c of said plurality of support planes 2; 2a, 2b, 2c onto the support surface 15 of said another support plane 2; 2a, 2b, 2c of said plurality of support planes 2; 2a, 2b, 2c.

If the support planes 2 of the vertical planter are is in the form of elongate essentially flat planes, as described earlier, the vertical planter may, as shown in FIG. 31, comprise at least one third slot 54a between the first lower edge 20 of the uppermost support plane 2a and the first upper edge 19 of the intermediate support plane 2c that is situated below the uppermost support plane 2a for allowing liquid nutrient 48 to flow from the support surface 15 of the uppermost support plane 2a onto the support surface 15 of the intermediate support plane 2c that is situated below the uppermost support plane 2a.

If the support planes 2 of the vertical planter are is in the form of elongate essentially flat planes, as described earlier, the vertical planter may, as shown in FIG. 32, comprise at least one fourth slot 54b between the first upper edge 19 of the lowermost support plane 2c and the first lower edge 20 of the intermediate support plane 2c that is situated above the lowermost support plane 2b for allowing liquid nutrient 48 to flow onto the support surface 15 of the lowermost support plane 2b from the support surface 15 of the intermediate support plane 2c that is situated above the lowermost support plane 2b.

If the support planes 2 of the vertical planter are is in the form of elongate essentially flat planes, as described earlier, the vertical planter may, as shown in FIG. 33, comprise at least one fifth slot 54c between the first upper edge 19 of one intermediate support plane 2c of said plurality of intermediate support planes 2c and the first lower edge 20 of another intermediate support plane 2c of said plurality of intermediate support planes 2c, which another intermediate support plane 2c is situated below the first intermediate support plane 2b, for allowing liquid nutrient 48 to flow from the support surface 15 of said one intermediate support plane 2c of said plurality of intermediate support planes 2c onto the support surface 15 of said another intermediate support plane 2c of said plurality of intermediate support planes 2c.

In the embodiments of the vertical planter shown in the figures, the nutrient conducting arrangement 5 of the nutrient supply system 3 comprises an intermediate plane 21 between two adjacent support planes 2. Each intermediate plane 21 is arranged at an angle between about 20° and about 60°, preferably at angle between about 30° and about 50°, more preferably at angle of about 40° with respect to a horizontal plane when the vertical planter is in its normal use position. Each intermediate plane 21 has a third end side 24 and an opposite fourth end side 25 and a second upper edge 26 and a second lower edge 27. In the embodiments of the vertical planter shown in the figures, the second upper edge 26 and the second lower edge 27 of each intermediate plane 21 are essentially horizontal and have essentially equal length between the third end side 24 and the fourth end side 25. In the embodiments of the vertical planter shown in the figures, the third end side 24 and the fourth end side 25 of each support plane 2 have essentially equal length between the second upper edge 26 and the second lower edge 27.

At least one first slot 28 is provided between the second upper edge 26 of the intermediate plane 21 and the first lower edge 20 of the support plane 2 that is situated above the intermediate plane 21 for allowing liquid nutrient 48 to flow from the support surface 15 of the upper support plane 2 onto the nutrient conducting surface 22 of the intermediate plane 21. At least one second slot 49 is provided between the second lower edge 27 of the intermediate plane 21 and the first upper edge 19 of the support plane 2; 2a, 2b, 2c that is situated below the intermediate plane 21 for allowing liquid nutrient 48 to flow from the second lower edge 27 of the intermediate plane 21 onto the support surface 15 of the lower support plane 2 that is situated below the intermediate plane 21. The first lower edge 20 of the support planes 2 may, as shown in the figures, be rounded to guide liquid nutrient 48 from the support surface 15 of the support plane 2 onto the nutrient conducting surface 22 of the intermediate plane 21 below the support plane 2.

If the vertical planter comprises such intermediate plane 21 between two adjacent support planes 2, the second upper edge 26 of the intermediate plane 21 and the first lower edge 20 of the support plane 2, which is situated above the intermediate plane 21, are preferably essentially parallel.

If the vertical planter comprises such intermediate plane 21 between two adjacent support planes 2, the second lower edge 27 of the intermediate plane 21 and the first upper edge 19 of the support plane 2, which is situated below the intermediate plane 21, are preferably essentially parallel.

If the vertical planter is provided with such intermediate plane 21 or with such intermediate planes 21, the nutrient conducting surface 22 of at least one intermediate plane 21 is preferably, but not necessarily, provided with second steps 23 or other formations (not shown in the figures) to slow down the flow of liquid nutrient 48 on the nutrient conducting surface 22 of the intermediate plane 21.

If the vertical planter is provided with such intermediate plane 21 or with such intermediate planes 21, the nutrient conducting surface 22 of at least one intermediate plane 21 is preferably, but not necessarily, provided with second steps 23 extending parallel between the third end side 24 and the opposite fourth end side 25 of the intermediate plane 21 to slow down the flow of liquid nutrient 48 on the nutrient conducting surface 22 of the intermediate plane 21.

If the vertical planter is provided with such intermediate planes 21 or with such intermediate planes 21, the nutrient reservoir 7 of the nutrient distribution means 4 of the nutrient supply system 3 may comprise a second set of holes 30 to deliver liquid nutrient 48 to an intermediate plane 21, preferably to an uppermost intermediate plane 21, if the vertical planter, as the vertical planter shown in the figures, comprises several intermediate planes 21 so that an intermediate plane 21 is always provided between two support planes 2.

If the vertical planter is provided with such intermediate plane 21 or with such intermediate planes 21, the nutrient conducting surface 22 of the intermediate plane 21 is in addition to a nutrient conducting surface 22 an additional support surface for supporting at least one plant and possible also tissue such as organic or synthetic tissue, as is the case in the second embodiment of the vertical planter illustrated in FIGS. 25 and 26. In such case, the vertical planter may comprise bayonets 36 for penetrating into plants arranged supported at the additional support surfaces of the intermediate plane 21 for retaining plants arranged supported at the additional support surface of the intermediate plane 21. The bayonets 36 are releasable attached to the intermediate plane 21. The intermediate plane 21 comprises oblong holes 43. Each bayonet 36 comprises a bayonet part 37, a foot part 38 comprising a first flange 39, a second flange 40 having short sides and long sides, and a shaft 41 between the first flange 39 and the second flange 40, wherein a bayonet 36 is releasable attachable to the intermediate plane 21 by inserting the second flange 40 of the foot part 38 through an oblong hole 43 in the intermediate plane 21 so that the first flange 39 becomes in contact with the intermediate plane 21, whereafter the bayonet 36 is turned in relation to the oblong hole 43 to releasable attach the bayonet 36 to the intermediate plane 21.

The vertical planter comprises such intermediate planes 21, at least one of the intermediate planes 21 is preferable, but not necessarily, provides with vertical flanges 45 projecting from the nutrient conducting surface 22 of said at least one intermediate planes 21.

The nutrient distribution means 4 of the nutrient supply system 3 or the nutrient supply system 3 may have an open top so that the nutrient distribution means 4 can receive rainwater.

The nutrient distribution means 4 of the nutrient supply system 3 or the nutrient supply system 3 may comprise a first hose connector for connecting a hose of a pump means 55 to the nutrient distribution means 4, and a second hose connector (not shown in the drawings) for connecting a hose of the pump means 55 to the nutrient receiving means 6. The pump means 55 may be supplied with power for example from an accumulator or a solar panel or from an electrical network.

Lighting Device

The vertical planter may comprise an at least partly transparent lighting device 32 for providing light to plants arranged supported at the supporting surfaces 15 of the support planes 2, 2a, 2b, 2c and to allow light waves originating from the sun, the lighting device 32 and/or other light sources (not shown in the drawings) to flow through the at least partly transparent lighting device 32. The at least partly transparent lighting device 32 comprises preferably, but not necessarily, LEDs (light-emitting diodes) 46, which are at least partly embedded in the material of the at least partly transparent lighting device 32 so that the material of the at least partly transparent lighting device 32 forms the optics for the LEDs forming the beam of light. The at least partly transparent lighting device 32 comprises preferably, but not necessarily, at least one heat sink (not shown in the drawings) that is at least partly embedded in the material of the at least partly transparent lighting device 32 and that is provided for cooling the LEDs 46.

The vertical may have an at least partly transparent lighting device 32 for providing light to plants arranged supported at the supporting surfaces 15 of the support planes 2, 2a, 2b, 2c and comprising an at least partly transparent arm member 33 to allow light waves to flow through the at least partly transparent arm member 33, and an at least partly transparent lighting member 34 transparent to allow light waves to flow through the at least partly transparent lighting member 34. Said at least partly transparent lighting member 34 is preferably, but not necessarily, pivotally connected to said at least partly transparent arm member 33.

The frame 1 of the vertical planter may comprise comprising mounting points 35 for lighting devices 32.

Said at least one at least partly transparent lighting device 32 is preferably, but not necessarily, removable attached or removable attachable to the frame 1.

Said at least one at least partly transparent lighting device 32 is preferably, but not necessarily, pivotally attached to the frame 1.

Bayonets

The vertical planter can, as in the first embodiment illustrated in FIGS. 1 to 24, in the second embodiment illustrated in FIGS. 25 and 26, and in the third embodiment illustrated in FIGS. 27 to 29 comprise bayonets 36 for penetrating into plants arranged supported at the support surfaces 15 of the support planes 2; 2a, 2b, 2c for retaining plants arranged supported at the support surfaces 15 of the support planes 2; 2a, 2b, 2c. The purpose of the bayonets 36 is to secure plants at the support planes 2.

The bayonets 36 are releasable attached to the support planes 2.

Each bayonet 36 may comprise a quarter turn fastener for releasable attaching the bayonet 36 to a support plane 2.

For releasable attaching the bayonets 36 to the support planes 2, the support planes 2 may comprise oblong holes 43, and each bayonet 36 may in addition to a bayonet part 37 comprise a foot part 38 comprising a first flange 39, a second flange 40 having short sides and long sides, and a shaft 41 between the first flange 39 and the second flange 40, wherein a bayonet 36 is releasable attachable to a support plane 2 by inserting the second flange 40 of the foot part 38 through an oblong hole 43 in a support plane 2 so that the first flange 39 becomes in contact with the support plane 2, where after the bayonet 36 is turned in relation to the oblong hole 43 to releasable attach the bayonet 36 to the support plane 2.

The first flange 39 of the foot part 38 is preferably, but not necessarily, in the form of a circular disk and the support plane 2 is preferably, but not necessarily, provided with seats 42 having a design and dimensions for cooperation with the first flanges 39 of the foot parts 38. In such case, the oblong holes 43 are provided in the seats 42.

Each seat 42 has preferably, but not necessarily, a supporting surface 44 that is plane parallel with the support plane 2.

The bayonet part 37 extends preferably, but not necessarily, in a non-perpendicular fashion from the first flange 39 in each bayonet 36. This allows positioning of the bayonet parts 37 of the bayonets 36 so that the bayonet parts 37 of the bayonets 36 extends in a non-perpendicular fashion from the support planes 2.

The support planes 2 may alternatively comprise at least one integral bayonet (not shown in the figures) or fixedly fastened bayonet (not shown in the figures).

The invention relates also to the use of the vertical planter according or to the use of any embodiment of the vertical planter in a hotel, a flower shop, in a mall, in a shopping center, or in an office building It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A vertical planter for growing plants, comprising:
a frame,
a plurality of support planes, each has a support surface for supporting at least one plant at an angle between 20 and 60° with respect to a normal horizontal plane, wherein said plurality of support planes are supported by the frame so that said plurality of support planes include an uppermost support plane and a lowermost support plane and a plurality of intermediate support planes positioned vertically between said uppermost support plane and said lowermost support plane, and
a nutrient supply system including:
a nutrient distribution means for delivering a liquid nutrient to the support surface of the uppermost support plane to form a film of the liquid nutrient on at least a part of the support surface of the uppermost support plane, wherein the nutrient distribution means is located vertically above said uppermost support plane,
a nutrient conducting arrangement for conducting the liquid nutrient from said uppermost support plane to said lowermost support plane via the support surface of each of the plurality of intermediate support planes to form a film of the liquid nutrient on at least a part of the support surface of the lowermost support plane and to form a film of the liquid nutrient on at least a part of the support surface of each of the plurality of intermediate support planes, wherein the support surface of each of the plurality of support planes forms a part of the nutrient conducting arrangement, and
a nutrient receiving means for receiving the liquid nutrient from the support surface of said lowermost support plane,
the nutrient distribution means including a liquid nutrient reservoir, and
the liquid nutrient reservoir including a first set of holes for delivering the liquid nutrient from the liquid nutrient reservoir to the support surface of the uppermost support plane,
wherein each of the support planes is in the form of an elongate plane including a first end side, an opposite second end side, a first upper edge and a first lower edge between the first end side and the second end side, wherein the first end side and the opposite second end side are parallel, and wherein the first upper edge and the first lower edge are parallel,
the nutrient conducting arrangement comprises an intermediate plane between two adjacent support planes located, respectively, above and below the intermediate plane, wherein the intermediate plane has a nutrient conducting surface that is arranged at an angle between 20 and 60° with respect to a normal horizontal plane, and wherein the intermediate plane has a third end side, an opposite fourth end side and a second upper edge and a second lower edge,
at least one first slot between the second upper edge of the intermediate plane and the first lower edge of the support plane that is located above the intermediate plane for allowing the liquid nutrient to flow from the support surface of the support plane that is located above the intermediate plane onto the nutrient conducting surface of the intermediate plane, and
at least one second slot between the second lower edge of the intermediate plane and the first upper edge of the support plane that is located below the intermediate plane for allowing the liquid nutrient to flow from the second lower edge of the intermediate plane onto the support surface of the lower support plane that is located below the intermediate plane.

2. The vertical planter according to claim 1, wherein:
the vertical planter comprises a plurality of identical growing modules each including a part of said frame and at least one support plane of the plurality of support planes, and
each of the identical growing modules is releasably attached to at least one other identical growing module of the plurality of growing modules so that the vertical planter has an uppermost identical growing module and a lowermost identical growing module.

3. The vertical planter according to claim 2, wherein:
the vertical planter comprises a nutrient distributing module including a part of said frame and the liquid nutrient reservoir of the nutrient distribution means of the nutrient supply system, and
the nutrient distributing module is releasably attached on top of the uppermost growing module of said plurality of growing modules.

4. The vertical planter according to claim 2, wherein:
the vertical planter comprises a nutrient receiving module including a part of said frame and said nutrient receiving means of the nutrient supply system, and
the nutrient receiving module is releasably attached under the lowermost growing module of said plurality of growing modules.

5. The vertical planter according to claim 1, wherein the nutrient receiving means of the nutrient supply system comprises a liquid nutrient tank.

6. The vertical planter according to claim 5, wherein:
the liquid nutrient tank includes a transparent wall member forming a nutrient level meter, and
the transparent wall member is made of green polymer for filtering out wave lengths from light suitable for photosynthesis in a liquid content in the liquid nutrient tank.

7. The vertical planter according to claim 5, wherein the liquid nutrient tank includes a removable plate member for at least partly covering a content of the liquid nutrient tank.

8. The vertical planter according to claim 5, wherein the liquid nutrient tank includes a drainage opening.

9. The vertical planter according to claim 1, wherein the support surface of each of the support planes is provided with first steps or other formations to slow down the flow of liquid nutrient on the support surface of the support plane.

10. The vertical planter according to claim 1, wherein:
the support surface of each of the support planes is provided with first steps to slow down a flow of the liquid nutrient on the support surface of the support plane, and
the first steps extending in parallel between the first end side and the opposite second end side of each of the support planes.

11. The vertical planter according to claim 1, comprising at least one third slot between the first lower edge of the uppermost support plane and the first upper edge of a first intermediate support plane of the plurality of intermediate support planes that is located below the uppermost support plane, for allowing the liquid nutrient to flow from the support surface of the uppermost support plane onto the support surface of the first intermediate support plane that is located below the uppermost support plane.

12. The vertical planter according to claim 11, comprising at least one fourth slot between the first upper edge of the lowermost support plane and the first lower edge of a second intermediate support plane of the plurality of intermediate support planes that is located above the lowermost support plane, for allowing the liquid nutrient to flow onto the support surface of the lowermost support plane from the support surface of the second intermediate support plane that is located above the lowermost support plane.

13. The vertical planter according to claim 12, comprising at least one fifth slot between the first upper edge of a third intermediate support plane of said plurality of intermediate support planes and the first lower-edge of another intermediate support plane of said plurality of intermediate support planes, wherein the another intermediate support plane is situated below the third intermediate support plane, for allowing the liquid nutrient to flow from the support surface of said third intermediate support plane of said plurality of intermediate support planes onto the support surface of said another intermediate support plane of said plurality of intermediate support planes.

14. The vertical planter according to claim 1, wherein:
the plurality of support planes are identical and located at the frame vertically above each other at the frame,
every other support plane of the plurality of support planes is located at a first angle at the frame with respect to a vertical plane and the rest of said plurality of support planes are located at a second angle at the frame with respect to the vertical plane, wherein the first angle and the second angle are opposite angles to each other with respect to the vertical plane,
a first distance between the every other support plane of said plurality of support planes is the same, and
a second distance between said rest of said plurality of support planes is the same.

15. The vertical planter according to claim 1, wherein the nutrient conducting surface of the intermediate plane is provided with steps or other formations to slow down a flow of the liquid nutrient on the nutrient conducting surface of the intermediate plane.

16. The vertical planter according to claim 1, wherein:
the nutrient conducting surface of the intermediate plane is provided with steps to slow down a flow of the liquid nutrient on the nutrient conducting surface of the intermediate plane, and
the steps extend parallel between the third end side and the opposite fourth end side of the intermediate plane.

17. The vertical planter according to claim 1, wherein the liquid nutrient reservoir of the nutrient distribution means includes a second set of holes to deliver the liquid nutrient to the intermediate plane.

18. The vertical planter according to claim 1, comprising:
an additional support surface formed on the intermediate plane for supporting at least one plant.

19. The vertical planter according to claim 18, comprising:
at least one bayonet for penetrating into and retaining the at least one plant arranged supported at the additional support surface of the intermediate plane,
the at least one bayonet is releasably attached to the intermediate plane,
the intermediate plane including a plurality of oblong holes,
each of the at least one bayonet including a bayonet part, a foot part including a first flange, a second flange including short sides and long sides, and a shaft between the first flange and the second flange, wherein the at least one bayonet is configured to be releasably attached to the intermediate plane by inserting the second flange of the foot part through a respective oblong hole of the plurality of oblong holes in the intermediate plane so that the first flange comes in contact with the intermediate plane, whereafter the at least one bayonet is turned in relation to the respective oblong hole to releasably attach the bayonet to the intermediate plane.

20. The vertical planter according to claim 19, wherein the support planes comprises seats for the at least one bayonet, and the plurality of oblong holes are provided in the seats.

21. The vertical planter according to claim 19, wherein the bayonet part extends in a non-perpendicular manner from the foot part in each of the at least one bayonet.

22. The vertical planter according to claim 1, comprising:
vertical flanges provided in the nutrient conducting surface of the intermediate plane.

23. The vertical planter according to claim 1, wherein the nutrient distribution means has an open top so that the nutrient distribution means is configured to receive rainwater.

24. The vertical planter according to claim 1, wherein:
the nutrient distribution means includes a first hose connector for connecting a hose of a pump to the nutrient distribution means, and
the nutrient receiving means includes a second hose connector for connecting the hose of the pump to the nutrient receiving means.

25. The vertical planter according to claim 1, comprising:
a lighting device for providing light to plants arranged supported at the support surfaces of the support planes and for allowing light waves to flow through the lighting device.

26. The vertical planter according to claim 25, wherein the frame comprises mounting points for a plurality of the lighting device.

27. The vertical planter according to claim 1, comprising:
C a lighting device for providing light to plants arranged supported at the support surfaces of the support planes and including a transparent arm member to allow light waves to flow through the transparent arm member, and a transparent lighting member to allow light waves to flow through the transparent lighting member.

28. The vertical planter according to claim 1, wherein:
the frame includes at least one pipe extending between the nutrient receiving means and the nutrient distribution means, and
said plurality of support planes are supported at said at least one pipe.

29. The vertical planter according to claim 28, wherein said at least one pipe penetrates at least one of said plurality of support planes.

30. The vertical planter according to claim 28, wherein said at least one is linear, and
said frame includes a floor stand to which said at least one pipe is fastened in a vertical position.

31. The vertical planter according to claim 30, wherein said floor stand is arranged vertically below said nutrient receiving means.

32. The vertical planter according to claim 28, wherein:
the nutrient supply system comprises a fluid channel in said at least one pipe, said fluid channel is in fluid connection with the nutrient receiving means and in fluid connection with the nutrient distribution means for leading the liquid nutrient from the nutrient receiving means to the nutrient distribution means, and the nutrient supply system includes a pump for pumping liquid nutrient (48) from the nutrient receiving means to the nutrient distribution means in said fluid channel.

33. The vertical planter according to claim 28, wherein:
the vertical planter includes a plurality of identical growing modules each having at least one support plane of the plurality of support planes, and each identical growing module of the plurality of growing modules is releasably attached to said at least one pipe of the frame so that the vertical planter has an uppermost identical growing module and a lowermost identical growing module.

34. The vertical planter according to claim 33, wherein the vertical planter comprises a nutrient distributing module including the liquid nutrient reservoir of the nutrient distribution means of the nutrient supply system, and the nutrient distributing module being releasably attached to said at least one pipe of the frame at least partly vertically above the uppermost growing module of said plurality of growing modules.

35. The vertical planter according to claim 33, wherein:
the vertical planter comprises a nutrient receiving module including said nutrient receiving means of the nutrient supply system, and the nutrient receiving module is releasably attached to said at least one pipe of the frame at least partly vertically below the lowermost growing module of said plurality of growing modules.

36. A vertical planter for growing plants, comprising:
a frame,
a plurality of support planes, each has a support surface for supporting at least one plant at an angle between 20 and 60° with respect to a normal horizontal plane, wherein said plurality of support planes are supported by the frame so that said plurality of support planes include an uppermost support plane and a lowermost support plane and a plurality of intermediate support planes positioned vertically between said uppermost support plane and said lowermost support plane, and
a nutrient supply system including:
  a nutrient distribution means for delivering a liquid nutrient to the support surface of the uppermost support plane to form a film of the liquid nutrient on at least a part of the support surface of the uppermost support plane, wherein the nutrient distribution means is located vertically above said uppermost support plane,
  a nutrient conducting arrangement for conducting the liquid nutrient from said uppermost support plane to said lowermost support plane via the support surface of each of the plurality of intermediate support planes to form a film of the liquid nutrient on at least a part of the support surface of the lowermost support plane and to form a film of the liquid nutrient on at least a part of the support surface of each of the plurality of intermediate support planes, wherein the support surface of each of the plurality of support planes forms a art of the nutrient conducting arrangement, and
  a nutrient receiving means for receiving the liquid nutrient from the support surface of said lowermost support plane,
the nutrient distribution means including a liquid nutrient reservoir, and
the liquid nutrient reservoir including a first set of holes for delivering the liquid nutrient from the liquid nutrient reservoir to the support surface of the uppermost support plane,
at least one bayonet for penetrating into and retaining plants arranged at each support surface of the plurality of support planes,
the at least one bayonet is releasably attached to the support surface, the support surface including oblong holes,
each of the at least one bayonet including a bayonet part, a foot part having a first flange, a second flange having short sides and long sides, and a shaft between the first flange and the second flange, wherein the at least one bayonet is configured to be releasably attached to the support surface by inserting the second flange of the foot part through a respective oblong hole of the oblong holes in the support surface so that the first flange comes in contact with the support surface, whereafter the bayonet is turned in relation to the respective oblong hole to releasably attach the bayonet to the support surface.

37. The vertical planter according to claim 36, wherein each of the support planes is in the form of an elongate plane including a first end side, an opposite second end side, a first upper edge and a first lower edge between the first end side and the second end side, wherein the first end side and the opposite second end side are parallel, and wherein the first upper edge and the first lower edge are parallel.

38. The vertical planter according to claim 37, comprising:
at least one slot between the first lower edge of one support plane of said plurality of support planes and the first upper edge of another support plane of said plurality of support planes that is situated below said one support plane of said plurality of support planes for allowing the liquid nutrient to flow from the support surface of said one support plane of said plurality of support planes onto the support surface of said another support plane of said plurality of support planes.

* * * * *